United States Patent
Cyr et al.

(10) Patent No.: US 11,360,651 B2
(45) Date of Patent: Jun. 14, 2022

(54) MOBILE COMMUNICATION SYSTEM WITH CHARGING STATION AND CIRCULAR USER INTERFACE

(71) Applicant: dTOOR Inc. SPC, Bellevue, WA (US)

(72) Inventors: Christina Cyr, Bellevue, WA (US); Kristen Faiferlick, Seattle, WA (US); Marjan Zamani, Kenmore, WA (US); Julia Cheng, Long Island City, NY (US)

(73) Assignee: dTOOR Inc. SPC, Bellevue, WA (US)

( * ) Notice: Subject to any disclaimer, the term of this patent is extended or adjusted under 35 U.S.C. 154(b) by 0 days.

(21) Appl. No.: 17/176,170

(22) Filed: Feb. 15, 2021

(65) Prior Publication Data

US 2021/0333958 A1  Oct. 28, 2021

Related U.S. Application Data

(60) Provisional application No. 62/976,760, filed on Feb. 14, 2020.

(51) Int. Cl.
| | | |
|---|---|---|
| *G06F 3/048* | (2013.01) | |
| *G06F 3/0484* | (2022.01) | |
| *H04M 1/72466* | (2021.01) | |
| *G06F 3/0488* | (2022.01) | |
| *G06F 3/16* | (2006.01) | |
| *G06F 1/16* | (2006.01) | |
| *G06Q 10/10* | (2012.01) | |

(52) U.S. Cl.
CPC .......... *G06F 3/0484* (2013.01); *G06F 3/0488* (2013.01); *G06F 3/165* (2013.01); *H04M 1/72466* (2021.01); *G06F 1/163* (2013.01); *G06Q 10/1095* (2013.01)

(58) Field of Classification Search
CPC ...... G06F 3/0484; G06F 3/0488; G06F 3/165; G06F 1/163; H04M 1/72466; G06Q 10/1095
See application file for complete search history.

(56) References Cited

U.S. PATENT DOCUMENTS

| | | | | |
|---|---|---|---|---|
| 8,954,895 | B1 * | 2/2015 | Yaksick | G06F 3/04847 715/863 |
| 2006/0261778 | A1 * | 11/2006 | Elizalde Rodarte | H02J 7/0044 320/114 |
| 2008/0278894 | A1 * | 11/2008 | Chen | G06F 1/1632 361/679.01 |
| 2011/0070924 | A1 * | 3/2011 | Kim | H04M 1/56 455/566 |
| 2011/0157046 | A1 * | 6/2011 | Lee | G06F 1/1643 345/173 |

(Continued)

OTHER PUBLICATIONS

Cyrcle by Kristen Faiferlick (https://web.archive.Org/web/20181219225727/http://www.kristen-faiferlick.com/cyrcle, attached as pdf), Dec. 19, 2018. (Year: 2018).*

*Primary Examiner* — Aleksey Olshannikov
(74) *Attorney, Agent, or Firm* — Christopher Mayle; Bold IP, PLLC

(57) ABSTRACT

A system and method for a mobile communication device having a circular display allowing more information to be displayed on the mobile communication device's display, a corresponding charging station, and a specially formatted user interface fully utilizing the circular display area of the mobile communication device.

20 Claims, 33 Drawing Sheets

(56) References Cited

U.S. PATENT DOCUMENTS

| | | | |
|---|---|---|---|
| 2013/0082965 A1* | 4/2013 | Wada | G06F 3/04883 |
| | | | 345/173 |
| 2014/0059487 A1* | 2/2014 | Baumann | G06F 3/0482 |
| | | | 715/811 |
| 2015/0248235 A1* | 9/2015 | Offenberg | G06F 3/0237 |
| | | | 715/773 |
| 2015/0331589 A1* | 11/2015 | Kawakita | G06F 21/31 |
| | | | 715/834 |
| 2016/0071241 A1* | 3/2016 | Karunamuni | G06F 3/04845 |
| | | | 345/156 |
| 2016/0320756 A1* | 11/2016 | Lee | G06F 3/03547 |
| 2017/0003720 A1* | 1/2017 | Robinson | G06F 3/0488 |
| 2017/0102838 A1* | 4/2017 | Roy | G06F 3/04845 |
| 2017/0124524 A1* | 5/2017 | Scriven | H04L 41/22 |
| 2017/0235398 A1* | 8/2017 | Choi | H04M 1/72454 |
| | | | 345/173 |
| 2018/0219987 A1* | 8/2018 | Pantel | G06F 1/1605 |
| 2020/0117342 A1* | 4/2020 | Jatram | H04W 4/80 |

\* cited by examiner

MOBILE COMMUNICATION SYSTEM WITH CHARGING STATION AND CIRCULAR USER INTERFACE

CROSS REFERENCE TO RELATED APPLICATIONS

This application is a non-provisional application claiming priority to provisional patent application 62/976,760 filed on Feb. 14, 2020.

FIELD OF DISCLOSURE

The field of disclosure is generally directed to the field of mobile communication devices. More particularly, the present invention relates to a mobile communication device, the mobile communication device capable of being coupled to a charging station, the mobile communication device having a circular graphical user interface that facilitates the displaying of data utilizing a circular viewing area whereby the circular graphical user interface displays data around the perimeter of the circular viewing area, where the information is capable of traveling around the perimeter of the circular viewing area.

BACKGROUND

Currently there are a number of mobile communication devices on the market that are designed with substantially rectangular cases and utilize substantially rectangular viewing screens. Some existing devices employ rounded corners and convex edges to deliver an aesthetically pleasing device to a user. However, the rectangular shape is uncomfortable for a user to grasp in their palm or hand. The display area or digital screen on these devices is substantially rectangular. Such a rectangular screen leads to grid layouts of information wherein data is substantially organized according to linear columns and rows.

Rectangular mobile communication devices of recent have been increasing in display surface area. However, rectangular mobile communication devices with widths greater than 7.5 cm are too large for a user to comfortably manipulate within their palm because of the rectangular shape. Large rectangular mobile communication devices then must resort to increasing the length of the screen to achieve larger display areas. This presents problems when users try to physically store the device and a higher reliance upon linear column and row presentation designs. In particular, a user may only be able to view a few hours of their calendar events at a time before needing to scroll to another selection of hours, thereby being limited in the viewable time allocated to events on their calendar.

Various studies have been performed indicating humans generally prefer curved shapes compared to rectangular shapes. When nonlinear information is presented inside a rectangular shape, the corners—void of useful information—present visual noise to the viewer and represent wasted space. Rounded corners appear less sharp and appear safer to a user. When information is displayed within a circular border, a viewer's attention is naturally drawn to the information at the center. The circular format makes information easier for a viewer to process and generates less cognitive load. In the instance of a human face, a circular bounded image of the face draws a viewer's attention to the center of the image and is easier on the viewer's eyes to process, as the circular bounded face is a more natural representation of a human's field of view. Scientific proof also exists demonstrating that humans prefer viewing round images. Further, media image consumption in the form of both photos and videos has increased in the last ten years. Providing an easier method of viewing this media is advantageous.

Furthermore, participants in an architectural design study were more likely to judge spaces as beautiful if they were of curvilinear design rather than rectilinear design. From magnetic resonance imaging of the participants' brains, curvilinear contours activated the anterior cingulate cortex exclusively, a region strongly responsive to the reward properties and emotional salience of objects. Thus, there exists a need to facilitate larger screen display sizes without increasing the width dimensions beyond a comfortable size or shape to fit in a person's palm. Additionally, there exists a need to present information in nonlinear formats in an efficient fashion that improves a viewer's focus, reduces cognitive load, and maximizes both the display size and display shape.

SUMMARY

One embodiment of the present invention is a computer implemented method representing one or more circular graphical user interfaces on a circular display, the method comprising of a circular graphical user interface comprising of a minor segment and a major segment which contains concentric annuli (FIG. 10), indicators on an initial graphical interface whereby each indicator corresponds to at least one stored application on the mobile communications system, each of these indicators being uniquely identified by an image on the first circular graphical user interface, each of these indicators at a location arranged within a middle annulus in the major segment of the first circular graphical user interface, displaying one or more secondary indicators within the minor segment of the first circular graphical user interface, each corresponding to at least one user-selected and stored application on the mobile communications system, each of the one or more secondary indicators being displayed as an image within the minor segment of the first circular graphical user interface, whereby one or more secondary indicators includes at least one user-settable identifying character, the identifying character indicating one or more secondary indicators as opposed to one of the one or more initial indicators, receiving a user input for requesting display of one or more hidden initial indicators, in response to a control gesture with the input device of the mobile communication system, in response to receiving the user input, moving one or more initial indicators within the middle annulus of the major segment on the first circular graphical user interface in a manner so as to reveal one or more initial indicators while hiding one or more initial indicators which were previously displayed, receiving the user input for accessing an application corresponding to the one or more indicators by a secondary control gesture and in response displaying a secondary circular graphical user interface, whereby receiving the user input for requesting display of another portion of the one or more indicators in response to the control gesture with the input device of the mobile communication system including a swipe or drag gesture, displaying a central indicator on the first circular graphical user interface, the central indicator displaying supplied data and formulas from stored applications, the central indicator at a location arranged within the center of the major segment of the first circular graphical user interface, displaying a control bar between an outer annulus and the middle annulus in the major segment of the first circular graphical user interface wherein application status data and information is shown, displaying the control bar between the outer annulus and the middle annulus in the major segment located on the first circular graphical user interface whereby such control bar can be moved by the user in order to rotate the initial indicators within the middle annulus in the major segment located on the first circular graphical user interface, displaying an indicator on the control bar to signify how far the control bar had been moved by the user, displaying one or more system data indicators on the outer annulus of the first circular graphical user interface, the one or more system data indicators displaying system data such as battery level and cellular signal strength, the outer annulus having a curved length to display over twice the number of system data indicators than current mobile communication systems of similar size, displaying a portion of one or more first calendar indicators on a secondary circular graphical user interface wherein referred to hereafter as the calendar circular graphical user interface, each soft button calendar indictor corresponding to at least one month, each of the first calendar indicators being uniquely identified by text on the calendar circular graphical user interface, each of the first calendar indicators at a location arranged within the middle annulus of the major segment of the calendar circular graphical user interface, while displaying one or more first calendar indicators, displaying one or more secondary calendar indicators on the calendar circular graphical user interface, each corresponding to user-settable inputted event data, each of the one or more secondary calendar indicators being displayed as text on a minor segment of the calendar circular graphical user interface, each of the secondary calendar indicators at a location in a minor segment on the calendar circular graphical user interface, receiving the user input for requesting display of another portion of the one or more first calendar indicators in response to the first control gesture with the input device of the mobile communication system, in response to receiving the user input for requesting display of one or more first calendar indicators with the input device of the mobile communication system, moving one or more first calendar indicators on the calendar circular graphical user interface in a manner so as to obscure one or more first calendar indicators displayed in the middle annulus of a major segment of the calendar circular graphical user interface while revealing one or more initial indicators in the middle annulus of a major segment of the calendar circular graphical user interface, receiving the user input for selecting a calendar indicator of one or more first calendar indicators corresponding to months of the year by a secondary control gesture, in response to receiving the user input for selecting the first calendar indicator of the one or more first calendar indicators by the secondary control gesture, displaying one or more third calendar indicators corresponding to days of the month, the one or more third calendar indicators positioned in the center of the major segment of the calendar circular graphical user interface, receiving the user input for selecting a third calendar indicator of one or more third calendar indicators located in the center of the major segment of the calendar circular graphical user interface by a third control gesture, in response to receiving the user input for selecting the third calendar indicator of one or more third calendar indicators by a third control gesture, displaying a set of secondary calendar indicators located in the minor segment of one or more secondary calendar indicators corresponding to the selected third indicator, receiving the user input for selecting a fourth calendar indicator on the calendar circular graphical user interface by a fourth gesture, in response to receiving the user input selecting the fourth calendar indicator by a fourth control gesture, displaying a secondary calendar circular graphical user interface (FIG. 12), the secondary calendar circular graphical user interface comprising of a clock shape with hourly data corresponding to the selected fourth calendar indicator, corresponding secondary calendar indicators sized in response to user inputted duration of the event, displaying an add indicator in the center of the secondary calendar circular graphical user interface, receiving the user input for selecting the add indicator by the first control gesture, in response to the receiving the user input for selecting the add indicator by the first control gesture, displaying a third calendar circular graphical user interface (FIG. 13) for receiving additional user inputted secondary calendar indicators, displaying a user keyboard on the segment of the third calendar circular graphical user interface, displaying a portion of one or more first contact indicators on a contacts circular graphical user interface (FIG. 16), each corresponding to at least one stored data of an entity, each of the first contact indicators being uniquely identified by a stored image corresponding to the entity, each of the first contact indicators at a location arranged inside the middle annulus within a major segment on the contacts circular graphical user interface, while displaying one or more secondary contact indicators in the center of the major segment of the contacts circular graphical user interface, each corresponding to a user-settable inputted secondary entity, each of the one or more secondary contact indicators being displayed as an image on the contacts circular graphical user interface corresponding to the secondary entity, each of the secondary contact indicators inside the one or more first contact indicators, receiving the user input for requesting display of another portion of the one or more first contact indicators in response to the first control gesture with the input device of the mobile communication system, in response to receiving the user input for requesting display of one or more hidden first contact indicators, displaying one or more hidden first contact indicators on the contacts circular graphical user interface in a manner so as to obscure one or more first contact indicators originally displayed in the middle annulus of the major segment while continuing to display the user-designated secondary contact indicators in the middle of the major segment, displaying one or more third contact indicators corresponding to one or more communication methods, the one or more third contact indicators positioned within the minor segment on the contacts circular graphical user interface, receiving the user input for selecting a contact indicator of the one or more initial contact indicators or a secondary contact indicator of the one or more secondary contact indicators and a third indicator of the one or more third indicators by one or more secondary control gestures, in response to receiving the user input for selecting the initial contact indicator of the one or more initial contact indicators or a secondary contact indicator of the one or more secondary contact indicators and a third contact indicator by the one or more secondary control gestures, initiating communication with the entity by a corresponding communication method of the one or more communication methods, displaying a search indicator on the contacts circular graphical user interface, the search indicator positioned within the center of the major segment of the contacts circular graphical user interface and inside of the one or more secondary contact indicators, receiving the user input for selecting the search indicator by the one or more secondary control gestures, in response to receiving the user input for selecting the search indicator by the one or more secondary control gestures, displaying a secondary contacts circular graphical user interface for receiving more of the user input search criteria to find a specific entity, displaying a lock screen circular graphical user interface, the lock screen circular graphical user interface having one or more lock screen indicators, the lock screen indicators having stored application supplied data and formulas operative on said application supplied data for display, receiving the user input for interacting with the lock screen indicators, displaying a phone circular graphical user interface (FIG. 20) for both the calling screen circular graphical user interface and the lock screen circular graphical user interface, the phone circular graphical user interface having one or more number indicators corresponding to numbers in a phone number, receiving the user input for requesting to dial a phone number having a number indicator in response to the initial control gesture with the input device of the mobile communication system, whereby on the lock screen circular graphical user interface the initial control gesture is a circular swiping gesture to the initial number indicator and on the calling screen circular graphical user interface the initial control gesture is a single touch, displaying a music circular graphical user interface, the music circular graphical user interface having one or more music control indicators corresponding to manipulation of one or more songs, one or more music control indicators located in the minor segment of the music circular graphical user interface whereby the major segment on the music circular graphical user interface has stored application supplied data and formulas operative on said application supplied data, displaying a volume control bar indicator on the music circular graphical user interface, the volume control bar indicator at a location arranged within a volume bar annulus in the major segment of the circular graphical user interface, receiving a user input for requesting alteration of a volume in response to the initial control gesture with the input device of the mobile communication system, in response to receiving the user input for the alteration of the volume, altering the volume and moving the volume indicator to a location where the initial control gesture ended, displaying a camera circular graphical user interface, the camera circular graphical user interface having one or more camera control indicators corresponding to a manipulation of one or more photos or videos, one or more camera control indicators located in a minor segment of four minor segments located at the top and bottom and left and right of the image of the photo or video located in the center of the camera circular graphical user interface, receiving the user input on the camera circular graphical user interface for selecting the transmission method indicator by the one or more secondary control gestures, in response to receiving the user input on the camera circular graphical user interface for selecting the transmission method indicator by the one or more secondary control gestures, displaying sample contact data for receiving one or more of the user input search criteria to find one or more specific contact data entities, in response to receiving the user input on the camera circular graphical user interface for selecting one or more contacts by the one or more secondary control gestures, displaying a messaging circular graphical interface, the messaging circular graphical user interface having one or more messaging control indicators, receiving the user input to compose a message on the messaging circular graphical user interface for selecting the indicator by the one or more secondary control gestures, in response to receiving the user input to compose the message on the messaging circular graphical user interface by the one or more secondary control gestures, displaying a messaging keyboard on the minor segment of the messaging circular graphical user interface, receiving the user input to send the message on the messaging circular graphical user interface by selecting a send indicator by the one or more secondary control gestures, in response to receiving the user input to send the message on the messaging circular graphical user interface by selecting a send indicator by the one or more secondary control gestures, transmitting the message according to the selected transmission method indicator and to the one or more specific contact data entities, displaying an internet browser circular graphical user interface, the internet browser circular graphical user interface having one or more internet browser control indicators.

Another embodiment of the present invention is directed to a circular shaped mobile communications system for storing and manipulating information, the circular shaped mobile communications system having one or more processors to display circular graphical user interfaces on a circular screen display, the circular graphical user interface configured for displaying a portion of one or more initial indicators on an initial circular graphical user interface, each corresponding to at least one stored application on the mobile communications system, each of the initial indicators being uniquely identified by an image on the initial circular graphical user interface, each of the initial indicators at a location arranged within an annulus in a major segment located on the initial circular graphical user interface, while displaying one or more initial indicators, displaying one or more secondary indicators on the initial circular graphical user interface, each corresponding to at least one secondary stored application on the mobile communications system, each of the one or more secondary indicators being displayed as an image on the initial circular graphical user interface, each of the one or more secondary indicators at a location in a minor segment located on the initial circular graphical user interface, whereby the one or more secondary indicators includes at least one user-settable identifying character, the identifying character indicating one of the one or more secondary indicators as opposed to one of the one or more initial indicators, wherein the major segment and minor segment are each regions of two-dimensional space that is bounded by an arc of a circle and by a chord connecting the endpoints of the arc, receiving the user input for requesting display of another portion of the one or more initial indicators in response to a control gesture with the input device of the mobile communication system, in response to said user input, displaying one or more hidden initial indicators on the initial circular graphical user interface in a manner so as to obscure one or more initial indicators originally displayed while continuing to display one or more secondary indicators and now displaying one or more initial indicators in the major segment of the circular graphical user interface, the system further including a camera on a center of the rear surface, a microphone, an earpiece, a loud speaker, GPS, and one or more communications ports, the system further including a charging station for charging the battery of the circular mobile communications system, the charging station holding the circular mobile communications system, the charging station having one or more communication ports and a projector for projecting content from the circular mobile communications system.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
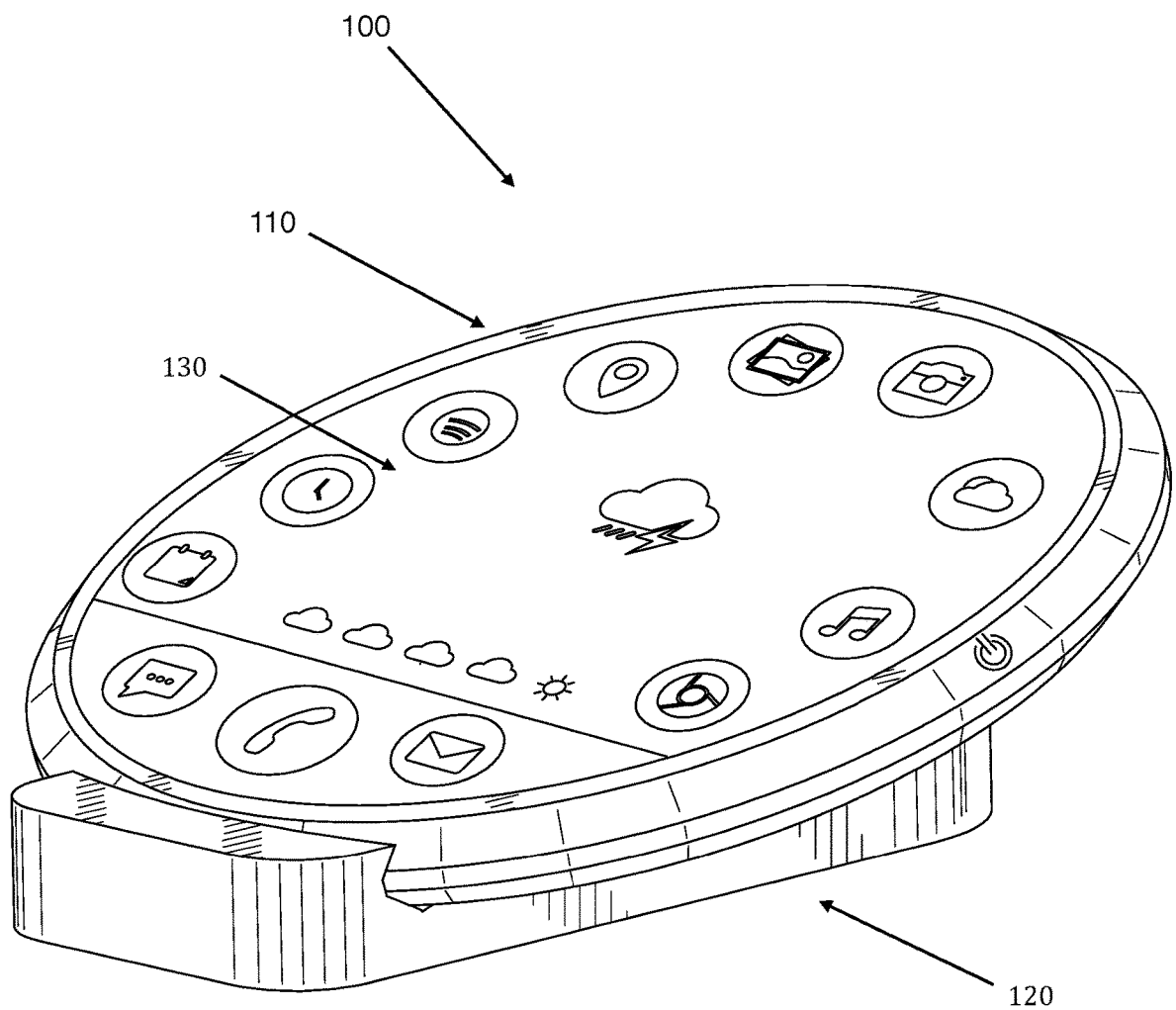
FIG. 1 illustrates a perspective view of the system of the present invention, including a mobile communication device, a circular graphical user interface displayed on mobile communication device, and a charging station.
Figure 2:
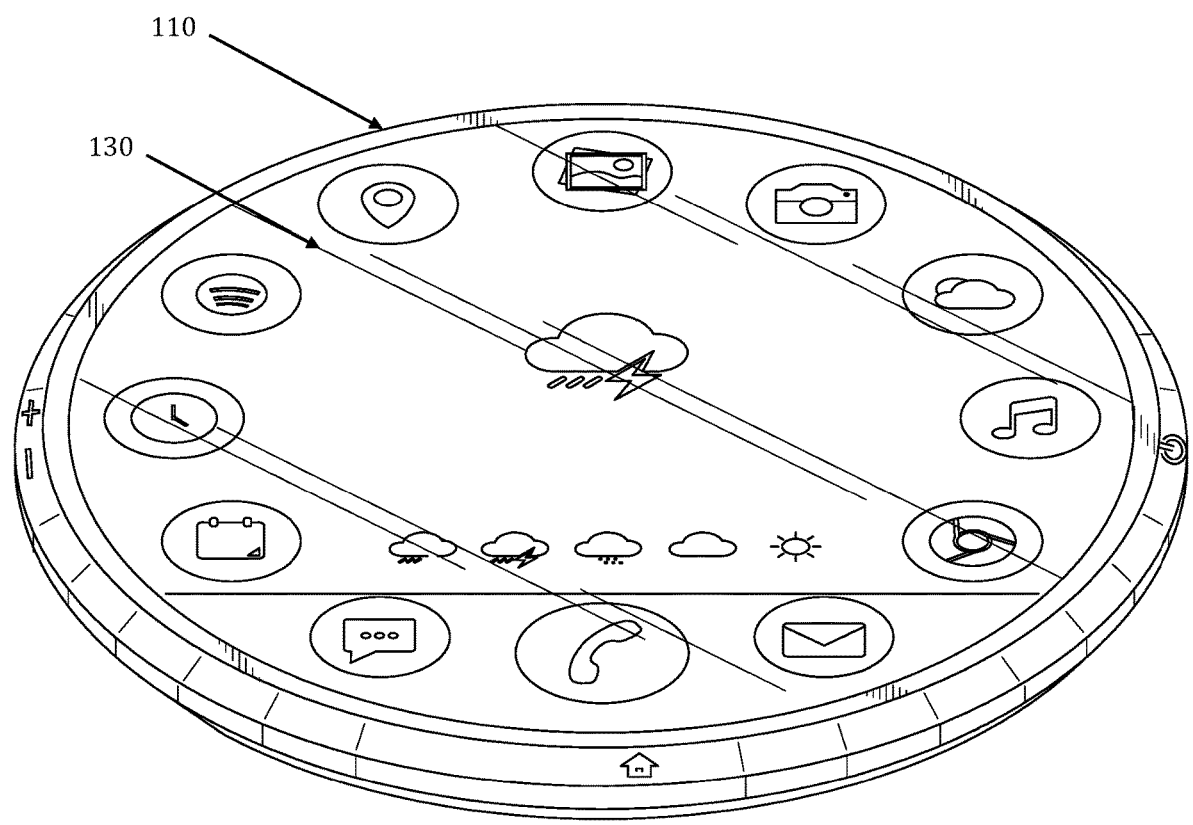
FIG. 2 illustrates a top perspective view of the mobile communication device.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure is generally drawn to a system and method, according to one or more exemplary embodiments, having three main components, a mobile communication device having a circular display letting more information be displayed on the mobile communication device's display which allows for the mobile communication device's circular graphical user interface to display information in ways not available for rectangular display devices as well as a corresponding charging station and a specially formatted graphical user interface fully utilizing the circular display area of the mobile communication device With reference now to FIG. 1, one exemplary embodiment of mobile communication system 100, having a mobile communication device such as mobile communication device 110, a charging station such as charging station 120, and a circular graphical user interface such as circular graphical user interface 130, according to the present invention is generally designated.

Mobile communication system 100 is unique in that it is structurally different from other known devices or solutions. More specifically, mobile communication device 110 is substantially circular or disk shape as can be seen in FIGS. 2-7, which represents an improvement of display size in regard to a limiting rectilinear dimension. When the limiting dimension of mobile communication device's 110 display is the width and that dimension is then fixed as the diameter of a circular display, the circular display would contain approximately 36% more useable display surface area compared to a rectilinear display. The round shape and dimensions of mobile communication system 100 allows it to fit more comfortably and/or ergonomically in the hand than rectangular mobile communication devices or other commonly used devices as well as in the pocket of a user for storage.

Figure 3:
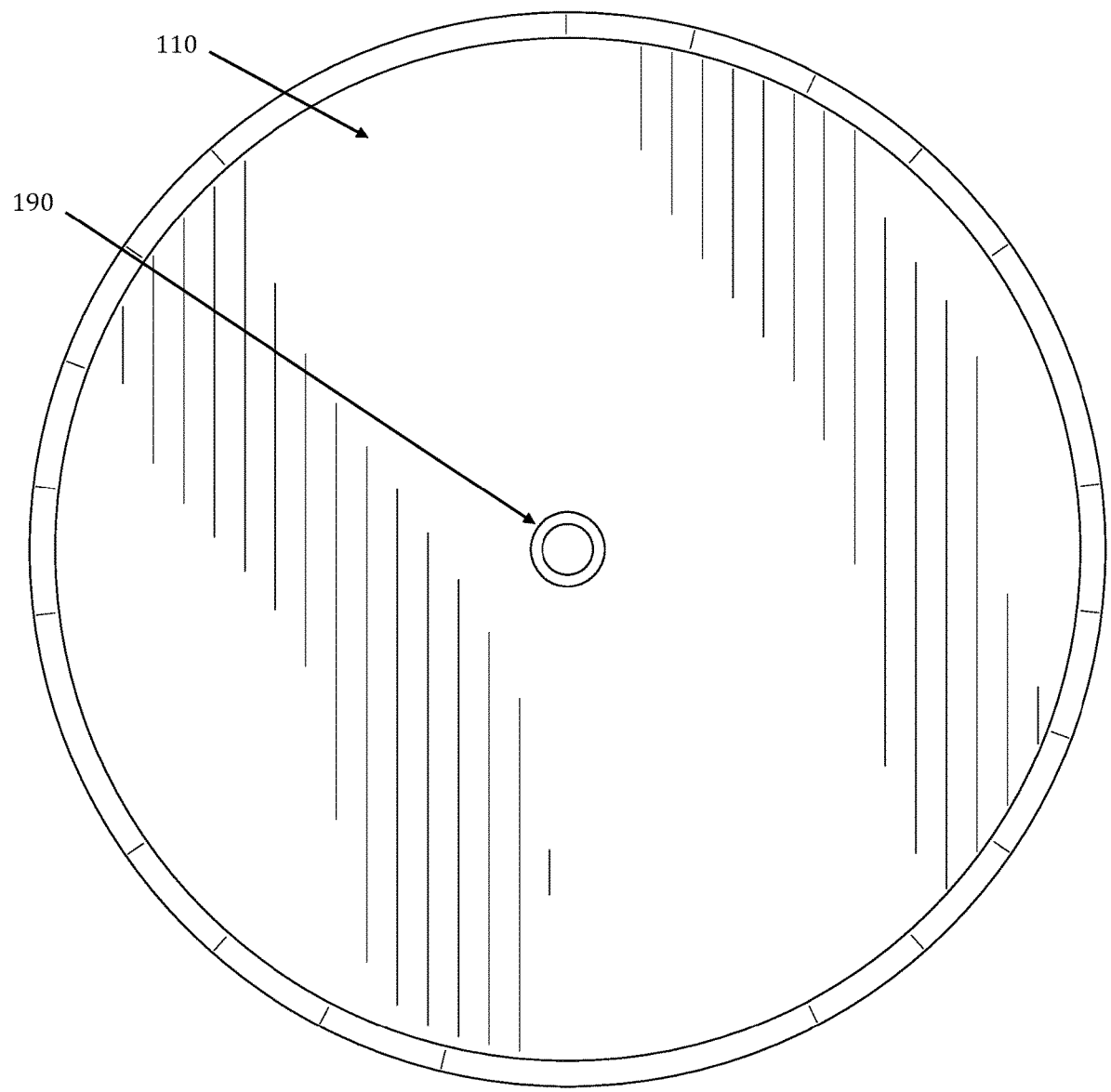
FIG. 3 is a bottom view of the mobile communication device.

The backside of mobile communication device 110 may be generally provided with a primary camera such as primary camera 190 as illustrated in FIG. 3, whereby primary camera 190 may have one or more lenses, one or more sensors, a photosensitive device, and one or more LED flash lights. However, this illustration is just one example and mobile communication device 110 may feature camera(s) and/or flash LEDs on the front, back, and/or side of mobile communication device 110. Camera 190 may utilize sensors such as a charged-coupled device (CCD) or Complementary Metal-Oxide Semiconductor (CMOS) to sense a captured scene. Sensors may capture light reflected from the scene taken and translate the strength of that light into a numeric reading by passing light through a number of different color filters whereby the readings are combined and evaluated via software to determine the specific color of each segment of the picture. In some embodiments, the front surface may have a secondary camera.

Figure 4:
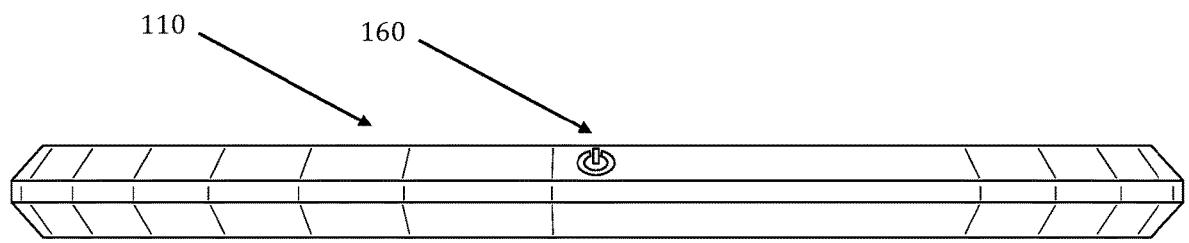
FIG. 4 is a left side view of the mobile communication device.
Figure 5:
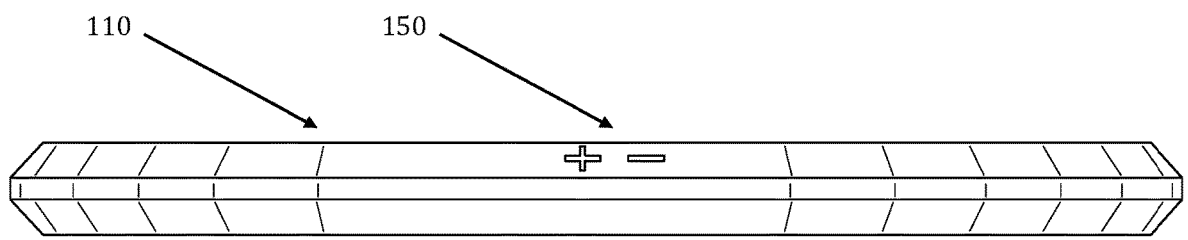
FIG. 5 is a right side view of the mobile communication device.
Figure 6:
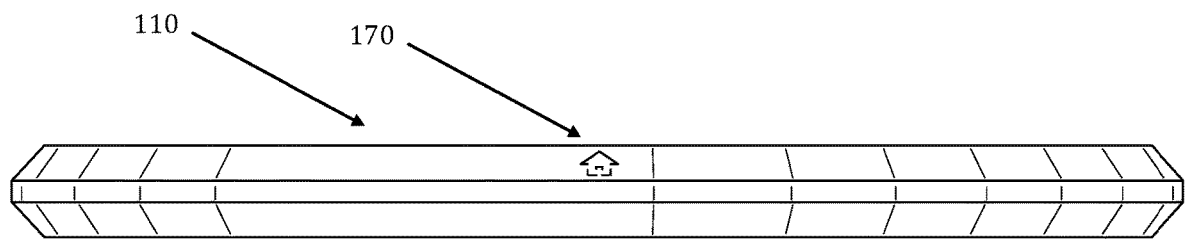
FIG. 6 is a bottom side view of the mobile communication device.
Figure 7:
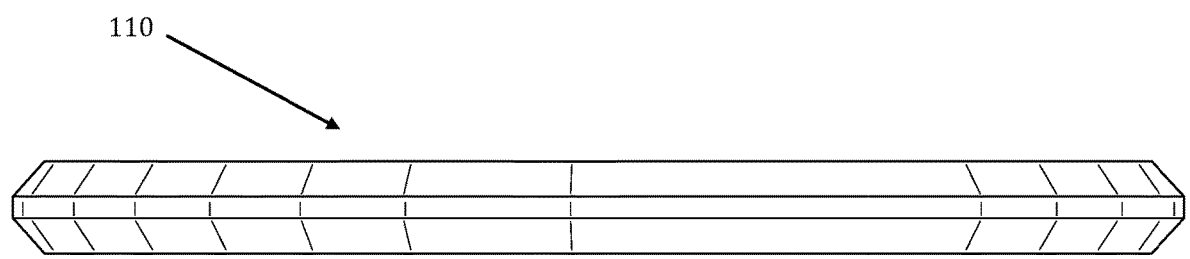
FIG. 7 is a topside view of the mobile communication device.

Mobile communication system 100 may include one or more buttons along the exterior of mobile communication device 110 including a power button such as power button 160 as illustrated in FIG. 4, for exiting and/or deactivating mobile communication device 110, volume up and volume down buttons such as volume up and volume down buttons 150 as illustrated in FIG. 5, for increasing and decreasing the volume of the audio output from mobile communication device 110, and a home button such as home button 170 as illustrated in FIG. 6, which may direct the user to mobile communication device 110's home screen. These locations are merely for illustrative purposes and mobile communication system 100 may feature a power control, volume control, and home control button, on the front, back, and/or side of mobile communication device 110, which may or may not feature a fingerprint reader for capturing and identifying biometric data related to the user. In some embodiments of mobile communication system 100 the sides of mobile communication device 110 may have no buttons.

Figure 8:
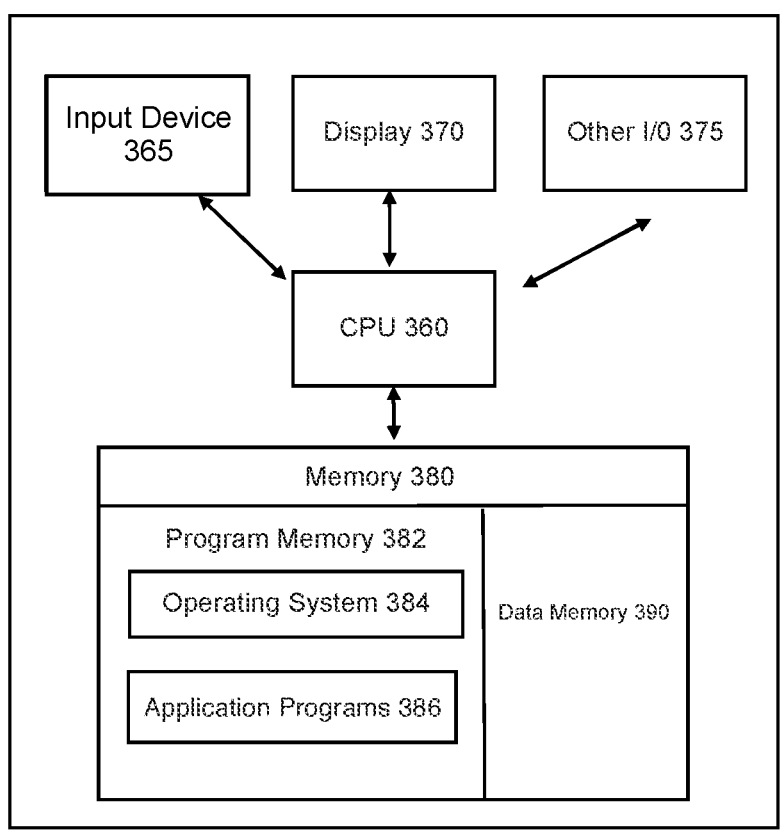
FIG. 8 depicts a block diagram of the mobile communication device.

Mobile communication system 100, as illustrated in FIG. 8 may include one or more input devices such as input device 365 that provides input to a CPU (processor) such as CPU 360 notifying it of actions. The actions may be mediated by a hardware controller that interprets the signals received from input device 365 and communicates the information to CPU 360 using a communication protocol. Input device 365 may include but is not limited to a mouse, a keyboard, a touchscreen, an infrared sensor, a touchpad, a wearable input device, a camera- or image-based input device, a microphone, or other user input device known by those of ordinary skill in the art.

CPU 360 may be a single processing unit or multiple processing units in a device or distributed across multiple devices. CPU 360 may be coupled to other hardware devices, such as one or more memory devices with the use of a bus, such as a Universal Serial Bus (USB), High-Definition Multimedia Interface (HDMI), PCI bus, or SCSI bus.

CPU 360 may communicate with a hardware controller for devices, such as for a display 370. Display 370 may be used to display text and graphics. The round shape of the display 370 of mobile communication system 100 is easier on the eye for viewing data and images such as when viewing photos and videos. The round shape of the display 370 features an unusual and dynamic space for circular graphical user interface 130. In some examples, display 370 provides graphical and textual visual feedback to a user. In some implementations, display 370 may include an input device 365, such as when input device 365 is a touchscreen or is equipped with an eye direction monitoring system. In some implementations, display 370 is separate from input device 365. Examples of display 370 include but are not limited to: an LCD display screen, a projected, holographic, virtual reality display, or augmented reality display (such as a heads-up display device or a head-mounted device), wearable devices such as electronic glasses, contact lenses capable of computer-generated sensory input and displaying data, and so on. Other I/O devices such as other I/O devices 375 may also be coupled to the processor, such as a network card, video card, audio card, USB, FireWire or other external device, camera, printer, speakers, CD-ROM drive, DVD drive, disk drive, or Blu-Ray device.

Display 370 may include a touch panel on the front and a display behind the touch panel, such as for example a light emitting diode (LED) monitor, however this is non-limiting and display 370 may be a cathode ray tube (CRT) or a liquid crystal display (LCD). Display 370 may also have cover glass bonded to a top surface of a touch panel using adhesive or any other fastening methods known by those of ordinary skill in the art.

Touch panels may have capacitive sense capabilities, whereby when a user touches the cover glass of display 370, the properties of the charged touch panel are altered in that spot, thus registering where mobile communication device 110 was touched. Touch panels may also be receptive to a stylus made of a conductive wire or other material configured to transmit an electrical signal necessary to register the contact. Touch panels may have resistive sense capabilities whereby a touch panel may have two conductive layers stacked inside the surface of display 370 whereby when a user presses down on the cover glass, the two layers come in contact, completing a circuit and sending a signal of where the mobile communication device 110 was touched.

CPU 360 may have access to a memory such as memory 380. Memory 380 may include one or more of various hardware devices for volatile and non-volatile storage and may include both read-only and writable memory. For example, memory 380 may comprise random access memory (RAM), CPU 360 registers, read-only memory (ROM), and writable non-volatile memory, such as flash memory, hard drives, floppy disks, SD cards, USB thumb drives, CDs, DVDs, magnetic storage devices, tape drives, device buffers, and so forth. Memory 380 is not a propagating signal divorced from underlying hardware; memory 380 is thus non-transitory. Memory 380 may include program memory such as program memory 382 capable of storing programs and software, such as an operating system such as operating system 384 for controlling the operation of mobile communication device 110, and other computerized programs or application programs such as application programs 386, whereby application programs 386 are executable programs configured to execute on top of the operating system to provide various functions. Application programs 386 may be web browsing programs, stand-alone applications, multimedia software, and other applications. Application programs 386 may receive or store data and/or to execute various operations with respect to the data. Memory 380 may also include data memory such as data memory 390 that may include database query results, configuration data, settings, user options or preferences, etc., which may be provided to program memory 382 or any element of mobile communication system 100.

Computer implemented methods consistent with one or more implementations of the current subject matter can be implemented by one or more data processors residing in mobile communication device 110. Mobile communication device 110 may exchange data and/or commands or other instructions via circuitry, which converts electrical signals to/from electromagnetic signals and communicates with communications networks and other communications devices via the electromagnetic signals. The circuitry may be radio frequency and may include well-known circuitry for performing these functions, including but not limited to an antenna system, a transceiver, one or more amplifiers, a tuner, one or more oscillators, a digital signal processor, a CODEC chipset, a subscriber identity module (SIM) card, one or more memory data storage, and so forth. The circuitry may communicate with various networks.

Networks may include a local area network (LAN), metropolitan area network (MAN), LoRa-WAN®, or a wide area network (WAN), such as the Internet or World Wide Web. A network may be a private network, a public network, or a combination thereof. Networks may be any type of network known in the art, including telecommunications networks, wireless networks (including Wi-Fi), and wireline networks. Networks may include mobile telephone networks utilizing any protocol or protocols used to communicate among mobile digital computing devices (e.g. Mobile communication system 100), such as 5G, LTE, GSM, GPRS, UMTS, AMPS, TDMA, or CDMA. In other non-limiting embodiments, mobile communication devices 110 may act as standalone devices or may be connected directly to other user mobile communication devices whereby mobile communication devices 110 may operate as a peer machine in a peer-to-peer (or distributed) network environment.

Mobile communication device 110 may include local wireless circuitry, which would enable short-range communication to another computing device as well as Bluetooth sensors and NFC chips. The local wireless circuitry may communicate on any wireless protocol, such as infrared, Bluetooth, IEEE 802.11, or other local wireless communication protocol.

Mobile communication device 110 may have one or more communication ports coupled to the circuitry to enable a wired communication link to another device, such as but not limited to another wireless communications device including a laptop or desktop computer, television, video console, speaker, smart speaker, or voice assistant such as Alexa Echo®. The communication link may enable communication between mobile communication device 110 and other devices by way of any wired communication protocol, such as USB wired protocol, RS-232, or some proprietary protocol. Mobile communication device 110 may have global positioning system (GPS) unit coupled to the circuitry to provide location information to the circuitry whereby GPS may provide the location information related to the location of mobile communication device 110 as known by those of ordinary skill in the art.

Mobile communication device 110 may communicate with other devices via communication links, such as USB (Universal Serial Bus) or HDMI/VGA (High-Definition Multimedia Interface/Video Graphics Array). Mobile communication device 110 may include voice recognition capable software that may be used to navigate or issue instructions as well as fingerprint recognition software, optical scanners, optical pointers, digital image capture devices, and associated interpretation software.

Mobile communications device 110 may store one or more user interfaces including circular graphical user interface 130. The circular graphical user interface 130 is unique in that the overall architecture of the system is different from other known systems. More specifically, it provides for the presentation of information in nonlinear formats, such as, but not limited to, contoured, curvilinear, or combination thereof, which improves a viewer's focus on the displayed information, reduces their cognitive load, and maximizes the information presented by maximizing both the display size and display shape of a substantially circular display screen or viewing area.

Circular graphical user interface 130 may be implemented as an operating system 384 or application programs 386 executed by, or running on, mobile communication device 110. Circular graphical user interface 130 may include screens having one or more dial-based menus, soft buttons, and/or other types of interfaces for controlling various functionality of application programs 386, for interacting with the data, and for interacting with or controlling other applications or resources stored on mobile communication device 110.

Circular graphical user interface 130 may be configured to display data and utilize a circular display area. Circular graphical user interface 130 may be configured such that presentations of data are situated along the perimeter of the circular display area on display 370. Circular graphical user interface 130 may present navigation options or other options in the form of soft buttons that may be arranged radially around circular graphical user interface 130. Circular graphical user interface 130 may also include various indicator areas, regions, segments, wedges or rings for indicating selection states of the soft buttons, selection history associated with the soft buttons, and states associated with functionality accessed via the soft buttons. Selection of a soft button corresponding to a navigation option causes mobile communication device 110 to modify circular graphical user interface 130 to provide functionality, navigation options, and/or other options associated with the navigation option selected.

Circular graphical user interface 130 may be configured to provide controls or gestures for selecting or de-selecting functionality and/or adjusting values or settings associated with various controls. Soft buttons may be presented on circular graphical user interface 130 to adjust a numeric value such as a volume setting, a brightness setting, or any other value that can be adjusted through or across a numerical range as well as navigate through contacts list or calendar dates. The numerical range can include negative numbers, decimal values, fractions, and/or any other representation of numbers or other ranges of values. In response to detecting a selection of a soft button, mobile communication device 110 may modify circular graphical user interface 130 to present additional or alternative controls for adjusting the numeric value.

Circular graphical user interface 130 is interactive, such as a touch-sensitive area of display 370, in which a user can input user commands and data input by gestures, such as by touching an icon with one or more fingers, a stylus, or other input implement. The touch gestures may then be measured by mobile communication device 110 and interpreted by circular graphical user interface 130 upon location of the gestures, a determined rotation axis of the gestures, a determined radius between the rotation axis and the contact point or points measured by circular graphical user interface 130, a movement speed, and/or other aspects of the gestures. Based upon these and other factors, mobile communication system 100 may determine a movement intended by the user and implement a command intended by the movement.

For example, circular graphical user interface 130 may be controlled via a single-touch-and-drag gesture. In this gesture, a user taps or touches the display with their finger or touch activated stylus and drags, slides, or otherwise moves their finger while in contact with the display. Mobile communication device 110 may interpret this gesture as an input for adjusting a value associated with circular graphical user interface 130. In interpreting this command, mobile communication device 110 may interpret the movement as occurring around a rotation axis located at the center of circular graphical user interface 130, or elsewhere, and implement a rotate command according to the measured angle of rotation determined by the tracked movement.

Circular graphical user interface 130 may also be controlled by a multi-touch-and-rotate gesture. In this gesture, a user taps or touches display with two or more fingers and rotates the fingers around a rotation axis. Mobile communication device 110 may interpret this gesture as an input for adjusting a value associated with circular graphical user interface 130. In interpreting this command, mobile communication device 110 determines a rotation axis about which the two or more fingers are rotated and measures a rotation angle through which the rotation occurs. In one or more non-limiting embodiments, mobile communication device 110 may implement the measured rotation as if occurring about a rotation axis located at a midpoint between the two contact points, at the center of circular graphical user interface 130, or elsewhere, and implement a rotate command in accordance with the measured rotation.

Circular graphical user interface 130 may then be controlled via a touch-slide-and-drag gesture. In this gesture, a user begins with a gesture that is substantially similar to the single-touch-and-drag gesture described above. As such, a user may begin by tapping or touching a touch-sensitive screen with one or more fingers and drags, slides, or otherwise moves his or her finger while in contact with the screen.

Circular graphical user interface 130 may be controlled via a pivot-and-rotate gesture. In this gesture, a user taps or touches a touch-sensitive screen with a first finger, touches the touch-sensitive screen with as second finger, and drags, slides, or otherwise moves the second finger while in contact with the screen and while holding the first finger stationary. Mobile communication device 110 may interpret this gesture as an input for adjusting a value associated with circular graphical user interface 130. In interpreting this command, mobile communication device 110 may interpret the movement as occurring around a rotation axis located at center of circular graphical user interface 130, or elsewhere, and implement a rotate command.

Figure 9:
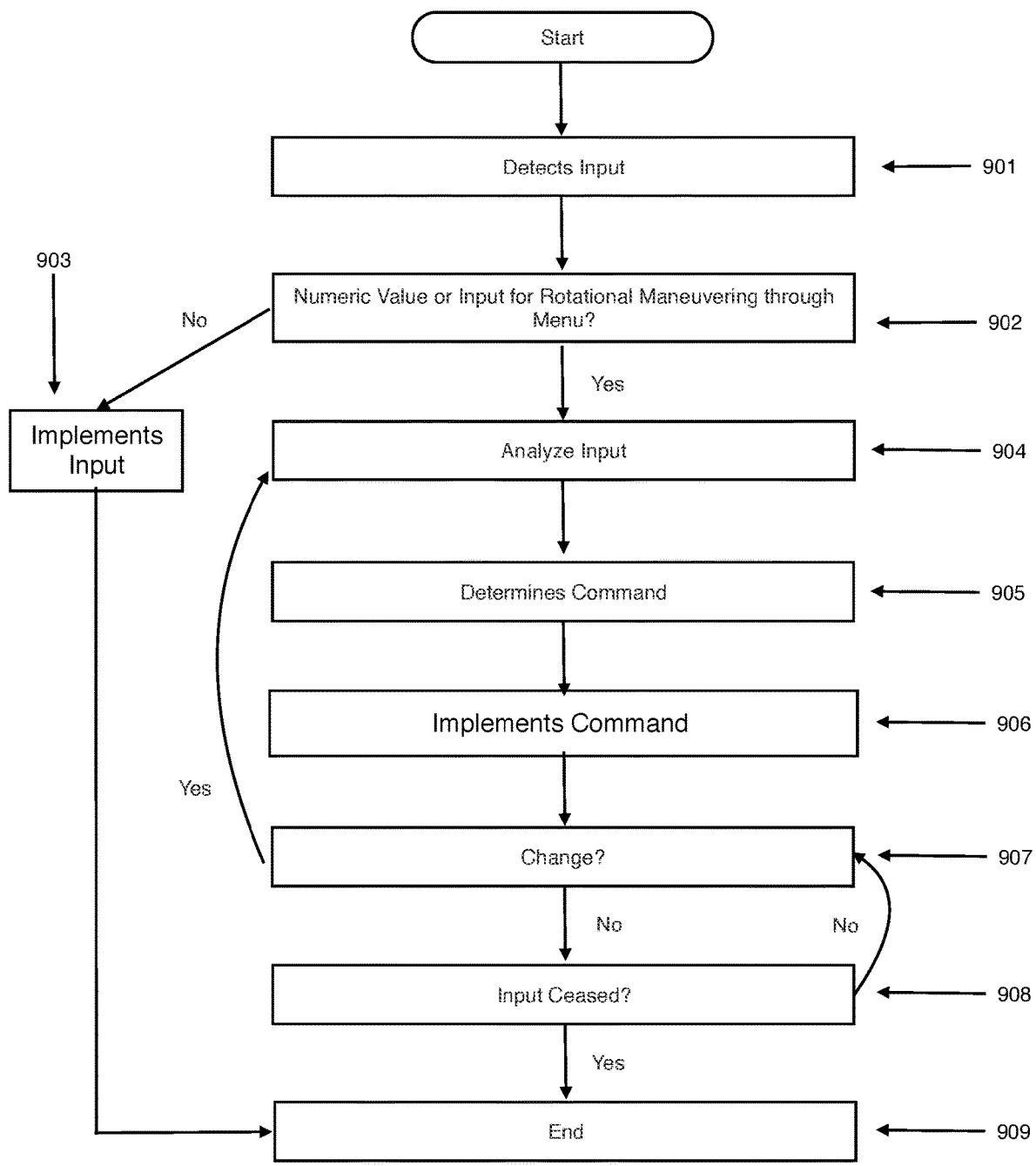
FIG. 9 illustrates a flowchart for showing aspects of a method for supporting interactions with a circular graphical user interface.

FIG. 9 is flow diagram illustrating the significant steps for supporting interactions with mobile communication system 100 through circular graphical user interface 130. To begin, mobile communication device 110 detects an input at step 901. At step 902, mobile communication device 110 determines if the input detected corresponds to an interaction with an option that has a numeric value or an input for rotational maneuvering through menus. Circular graphical user interface 130 may present various user interface controls for accessing functionality including, but not limited to, options having a numeric value, options for rotational maneuvering through menus, navigating to other menus, options having a Boolean value, or a combination of one or more of these controls.

If the input detected corresponds to an interaction with an option that does not have a numeric value or is not for rotational maneuvering through menus, the method proceeds to step 903. At step 903, mobile communication device 110 implements the input detected, which may be a navigation option to another menu or screen or a Boolean option such as, for example, a true/false option, a yes/no option, a zero/one option, an enabled/not-enabled option, or another Boolean option, for example navigating to but not limited to a particular menu, calendar date, time, contact, or song selection.

If mobile communication device 110 determines that the input detected corresponds to an interaction with an option having a numeric value or for rotational maneuvering through menus, the method proceeds to step 904.

At step 904, mobile communication device 110 analyzes the input to determine a command associated with the input. In some embodiments, where the input includes one or more touch commands, mobile communication device 110 identifies one or more contact points associated with the input and movement of the contact point(s), if any. Mobile communication device 110 may also determine a rotation axis of the one or more contact points and a radius associated with the rotation.

The method proceeds to step 905, whereby mobile communication device 110 determines a command associated with the detected and analyzed input. Mobile communication device 110 may determine, for example, that a detected rotation around a determined rotation axis corresponds to a command for increasing or decreasing a numeric value or rotational maneuvering through a menu. The method proceeds to step 906 whereby mobile communication device 110 implements the command and updates circular graphical user interface 130. Circular graphical user interface 130 may be updated to indicate that an option has been selected, a value associated with the selected option, to display or hide numeric value adjustment controls, to show or hide various indicators such as anchor point, pivot point, and/or contact point indicators, and/or to show or hide other information. In some embodiments, mobile communication device 110 may update the display to show how input from the user has been or is being implemented by circular graphical user interface 130.

The method then proceeds to step 907, whereby mobile communication device 110 determines if the input has changed. According to various embodiments, the input can be determined to have changed if a rate of movement has changed, if a rotation axis associated with the movements has moved, if the radius of the contact points has moved, if the number of contact points has changed, if a direction of movement has changed, or if other changes are detected. If mobile communication device 110 determines that the input has changed, the method returns to step 904, whereby mobile communication device 110 determines if the modified input corresponds to a multi-touch input or not. Steps 904-907 may be iterated until mobile communication device 110 determines that the input has not changed.

If mobile communication device 110 determines that the input has not changed, the method proceeds to step 908, whereby mobile communication device 110 determines if the input has ceased and/or if the command has been completed. Mobile communication device 110 may determine, for example, that the contact has ceased or that movement has ceased. If mobile communication device 110 determines that the input has not ceased, the method returns to step 907. If mobile communication device 110 determines that the input has ceased, the method proceeds to step 909 whereby the operation is ended.

Figure 10:
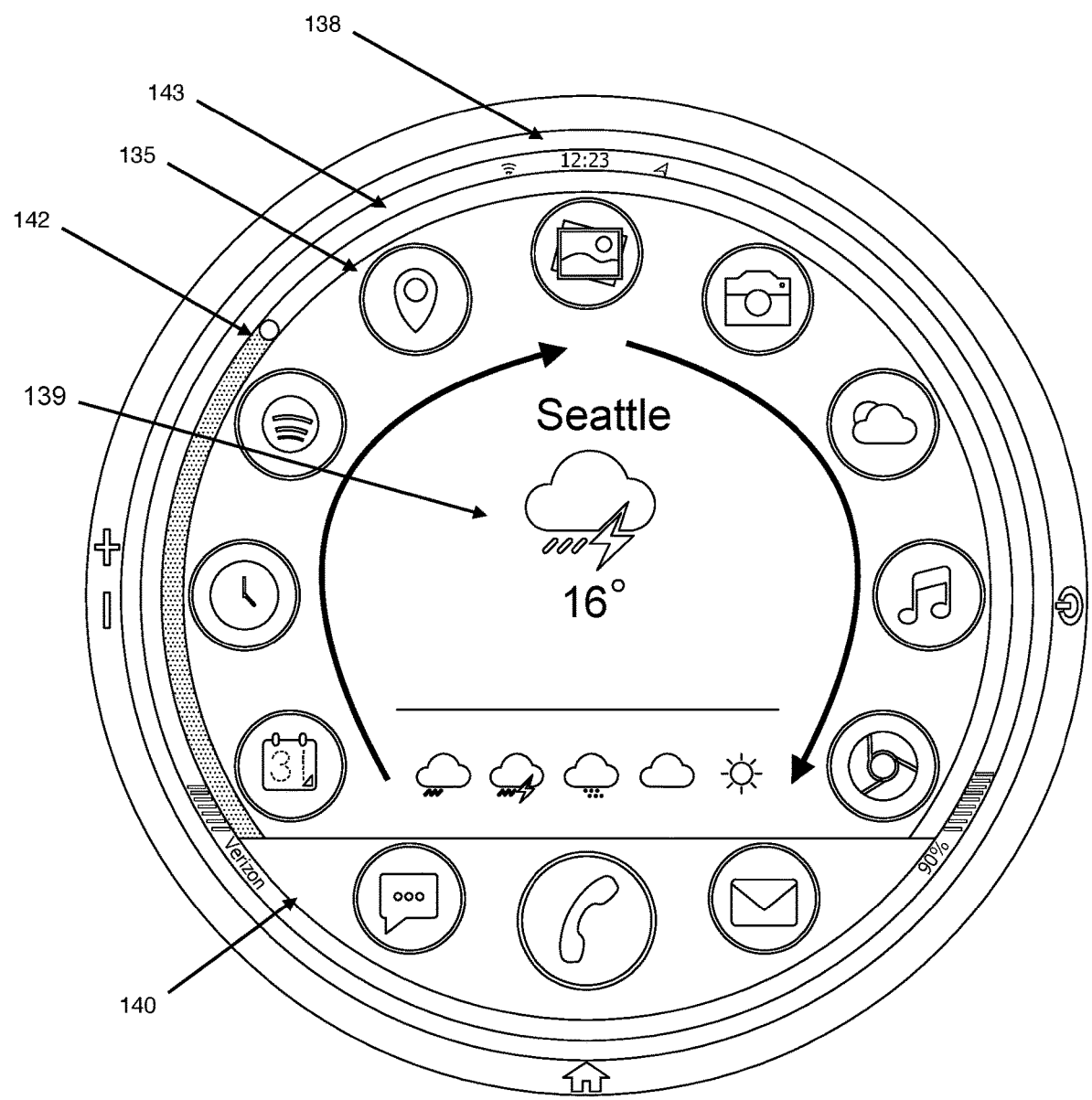
FIG. 10 illustrates a home screen of the circular graphical user interface
Figure 11:
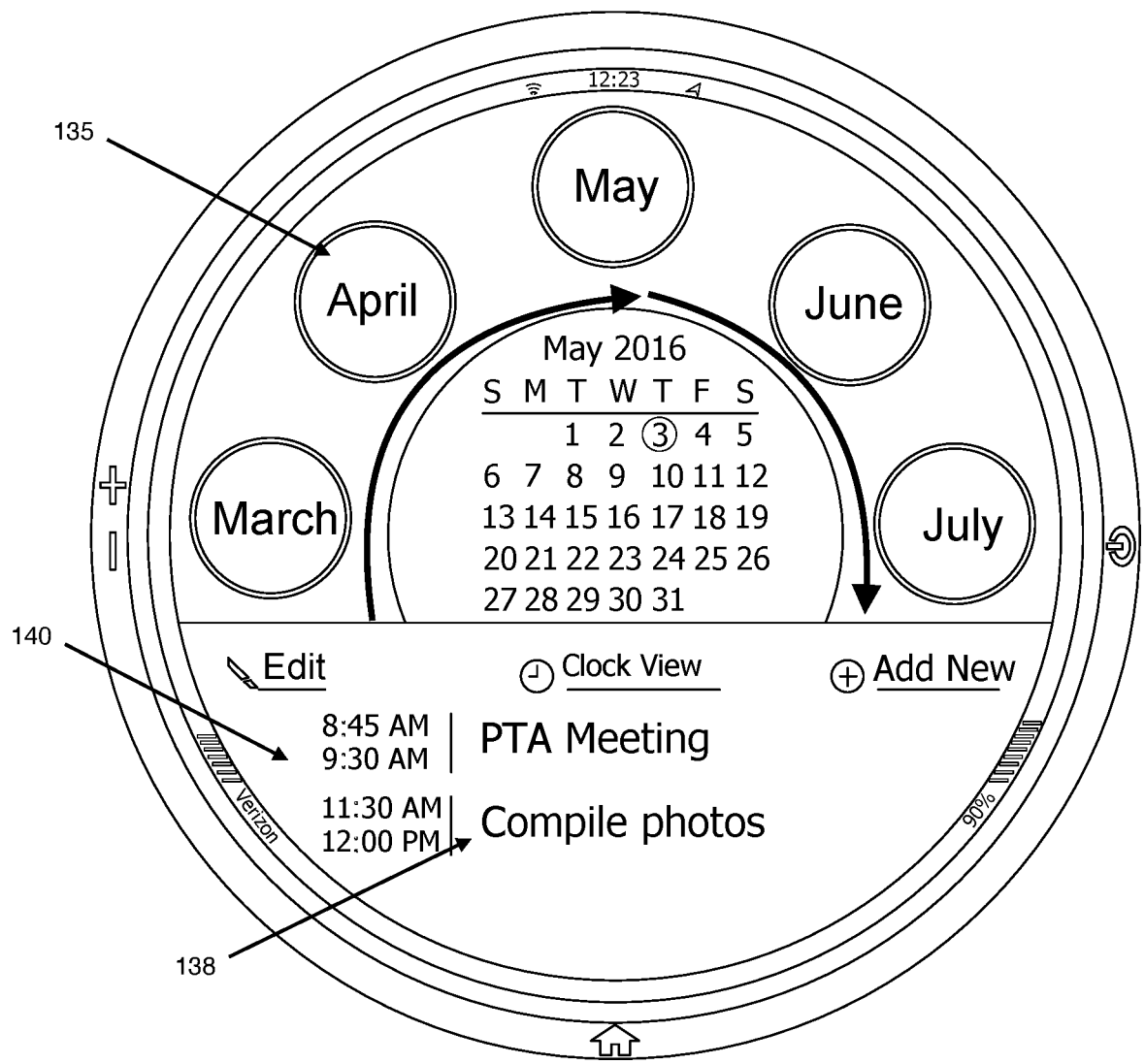
FIG. 11 illustrates a calendar screen of the circular graphical user interface.

Turning now to FIGS. 10-11, user interface diagrams show the various aspects of the concepts disclosed for interacting with a circular graphical user interface 130.

FIG. 10 shows circular graphical user interface 130 generated by mobile communication device 110 depicting a home screen having soft button user interface controls such as soft buttons 135 along the perimeter of mobile communication device 110's display 370 arranged around the center of display 370. Though soft buttons 135 are illustrated as being substantially circular and of a specific size, it should be understood by one of ordinary skill in the art that soft buttons may be of any shape, size, or distribution and may include formats such as buttons, sliding bars or dials.

Soft buttons 135 may be but not limited to numerical options, Boolean options, navigation options, other options, or a combination of options. A numerical option corresponds to a command or action for adjusting, entering, or changing a numeric value. For example, a level of a brightness may be adjusted via adjustment of a numeric value, for example, from a level of one to a brightness of one hundred. A "Boolean" option may include any type of yes/no, true/false, zero/one, enabled/not-enabled, or other Boolean option or value. A navigation option can include an option to navigate to another menu, category, sub-category, or the like.

Circular graphical user interface 130 may display an adjustment dial. The adjustment dial may include an indicator such as a dot, mark, or arrow, for indicating a measurement point associated with the numeric value being set or adjusted by circular graphical user interface 130. A user may adjust a numeric value on circular graphical user interface 130 by entering various types of input or gestures corresponding to one or more commands, such as dragging their finger from one point on the dial to a second point on the dial. For example, if the user wishes to increase the brightness of the display, they may place their finger on the brightness' current point and drag their finger from the current point to a point farther about the rotation axis to rotate the dial to the desired brightness level. The user may also select the point along the dial that is the desired value on the dial for the brightness.

Circular graphical user interface 130 may display data generated by mobile communication device 110, such as data 138. Data 138 may be indicators for display of the mobile communication device 110's connectivity (Wi-Fi, Bluetooth, etc.), the current time, the mobile communication device's current mode, carrier information, and the battery life of mobile communication device 110. Circular graphical user interface 130 may display data 138 generated by mobile communication device 110 that has been selected or chosen by the user, such as current weather, upcoming events in the user's calendar, or a selection of the user's preferred applications.

Circular graphical user interface 130 may display a status bar such as status bar 143, which displays data 138. In some embodiments, for example, as illustrated in FIG. 10, status bar 143 may be located at the outer edge of circular graphical user interface 130.

Circular graphical user interface 130 may be configured to operate as a dial-based menu whereby objects such as data 138, soft buttons 135, or any other objects are rotatable about the perimeter of the circular display area. Soft buttons 135 may be arranged alphabetically, by type, by genre, by amount of activity, or selected by the user. Soft buttons 135 may be arranged in folders so that the user may access soft buttons more quickly and interact with them. In one or more non-limiting embodiments, mobile communication device 110 may generate multiple home screens and multiple dial-based menus. In accordance with the concepts disclosed herein, a user may scroll through the dial-based menu and thus the available soft buttons through circular graphical user interface 130 by entering various types of input corresponding to one or more commands.

In some embodiments, for example, as illustrated in FIG. 10, a user may only see soft buttons 135 signifying navigation options for calls, calendar, time, GPS, Wi-Fi, pictures, weather, camera, music, and internet on the display. To search for a soft button not currently displayed, signifying a navigation option for another application, the user may slide their finger in an arc motion whereby circular graphical user interface 130 will scroll through the dial-based menu to view other soft buttons which then appear visible on display 370 to the user while previous navigation buttons may be obscured or disappear when scrolled past. Customizable widgets 139 may be positioned in the center of the circular graphical user interface 130 having stored application data or other information that are displaying to the user. For instance, the widget may display a 7-day weather forecast.

In this example, soft buttons 135 signifying navigation options scroll in a clockwise motion, as shown by the arrows on FIG. 10. Whereby to scroll forward through the navigation options the user may slide their finger on display 370 in a clockwise motion, and to scroll backward through the navigation options the user may slide their finger on display 370 in a counterclockwise motion. However, this is non-limiting, and the user may instead slide their finger in a counterclockwise motion to scroll forward and clockwise to scroll back. In further embodiments, the user may specify if they wish the scroll direction to be natural with the motion of their fingers or inverted or opposing their finger movement. In one or more non-limiting embodiments, mobile communication system 100 may generate a progress bar along the perimeter of display 370 to display and track a user's progress of scrolling through the dial-based menu. In some embodiments, as the user continues scrolling through the information, the progress bar along the perimeter of the display area changes from an original color to one or more secondary colors in proportion to the user's progress of scrolling through the dial-based menu as demonstrated in FIG. 22

In some embodiments, circular graphical user interface 130 may display a control bar such as control bar 142, which may be positioned within the area of circular graphical user interface 130. For example, as illustrated in FIG. 10, control bar 142 may be located just inside status bar 143 and in the shape of approximately ¾ of a circular ring, each end terminating at the edge of static bar 140. Inside control bar 142 a user may find a point, which indicates a position on the bar. The point position may indicate and control such features as the volume level, or the status of rotation through an unlimited collection of application icons.

In some embodiments, mobile communication system 100 may generate a static display bar such as static bar 140 to be displayed through circular graphical user interface 130 whereby soft buttons 135, data 138, or even a combination thereof remain visible in static bar 140 as the user cycles through the dial-based menu. The objects that may be displayed on static bar 140 may be predetermined or selected by the user. Static bar 140 may reside in approximately the lower third of circular graphical user interface 130, with a unique half-moon shape, otherwise known as a segment. The consistency of the placement and shape of static bar 140, whether on the main screen in FIG. 10, or utilized in an application as demonstrated in FIG. 21, has been shown to provide comfort and ease of use for the user.

As illustrated in FIG. 11, mobile communication device 110 may generate a circular graphical user interface 130 depicting a monthly calendar screen that may be accessed from the home screen by a user tapping a navigation option soft button 135, indicated by the graphical representation of a calendar button. The monthly calendar screen is a unique approach to displaying a selection of months as soft buttons 135, the days of the month in the center of circular graphical user interface 130, and data 138 in static bar 140 for the chosen date. In some embodiments, soft buttons 135 may be rotated until the desired month is found whereby to scroll forward through the months the user may slide their finger on display 370 in a counterclockwise motion and to scroll backward through the months the user may slide their finger on display 370 in a clockwise motion. Users may select one of the months whereby mobile communication device 110 generates a calendar showing the days of that month displayed.

Users may then select a particular date from the list of days from the calendar and be presented with the events corresponding to that date. Circular graphical user interface 130 may present a soft button 135 in the form of a navigation option labeled clock view whereby once selected by the user, mobile communication device 110 generates a circular graphical user interface 130 depicting a specific date, as illustrated in FIG. 12, which displays data 138 in the form of events scheduled for that day as inserted by the user or synced with another third party application whereby events are displayed on display 370 as sectors and the duration of each event is visually depicted by the relative size of the event's sector.

Figure 12:
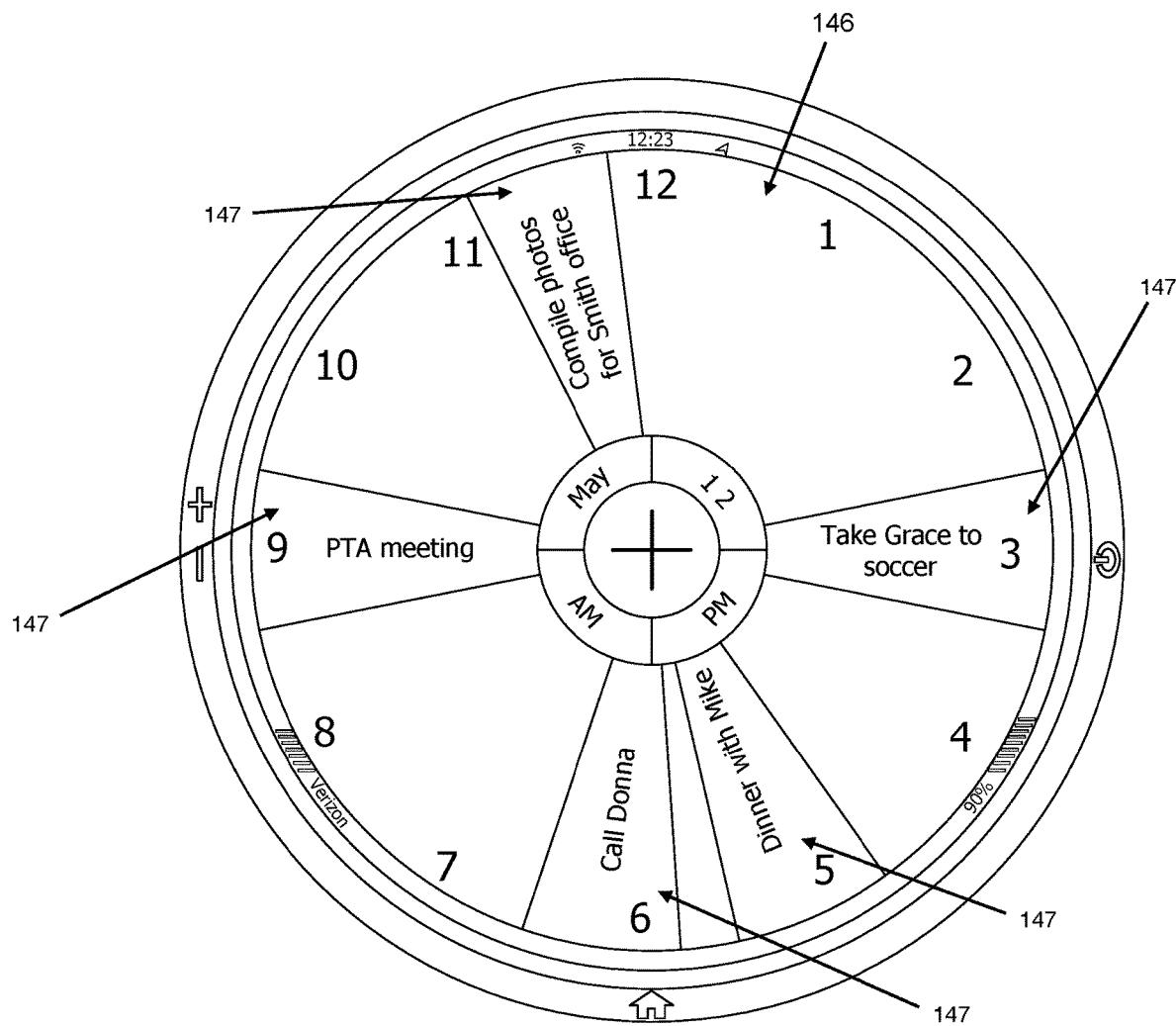
FIG. 12 illustrates another display of a calendar screen of the circular graphical user interface.

Circular graphical user interface 130 may also be configured such that data, such as, but not limited to, calendar events, are displayed in a wedge layout 146, as illustrated in FIG. 12. The wedge layout 146 organizes data within 12 blocks in the shape of a wedge, referred to as data block wedges 147, as illustrated in FIG. 12. Appointments may span and/or cut data block wedges 147, and there may even be multiple appointments or data within each data block edges 147. The wedge layout 146 may include a center ring which displays a month comprised as a circle or bubble-shape, a numerical number for the day, a 12-hour display for morning (AM), a 12-hour display for evening (PM) appointments, or other data; these indicators may also be soft buttons 135. The wedge layout 146 may have a "+" button, referred to in FIG. 12, which can be utilized by the user to enter a new calendar appointment or data. The wedge layout 146 is not just limited to display calendar events and time and may be suitable for any other interface.

This represents an improvement over existing art by allowing a user to view a larger selection of time and/or data 138, such as viewing all events within a twelve-hour period and their relative proportion of allocated time by the size of the event's data block wedge. Mobile communication device 110 may generate a selection soft buttons 135 to the user, including, but not limited to, day of the week, calendar date, month, year, AM/PM, and "+" icon. An icon, such as, but not limited to "+" icon, may allow a user, after selecting the icon, to add an event to their calendar or data 138. While the user views the wedge layout 146 presentation of time and/or data 138, the user may select a data block wedge 147, and the system may prompt the user to add or edit a calendar event and/or data 138 for the user's selected data block wedge 147.

Figure 13:
FIG. 13 illustrates another display of a calendar screen of the circular graphical user interface.
Figure 14:
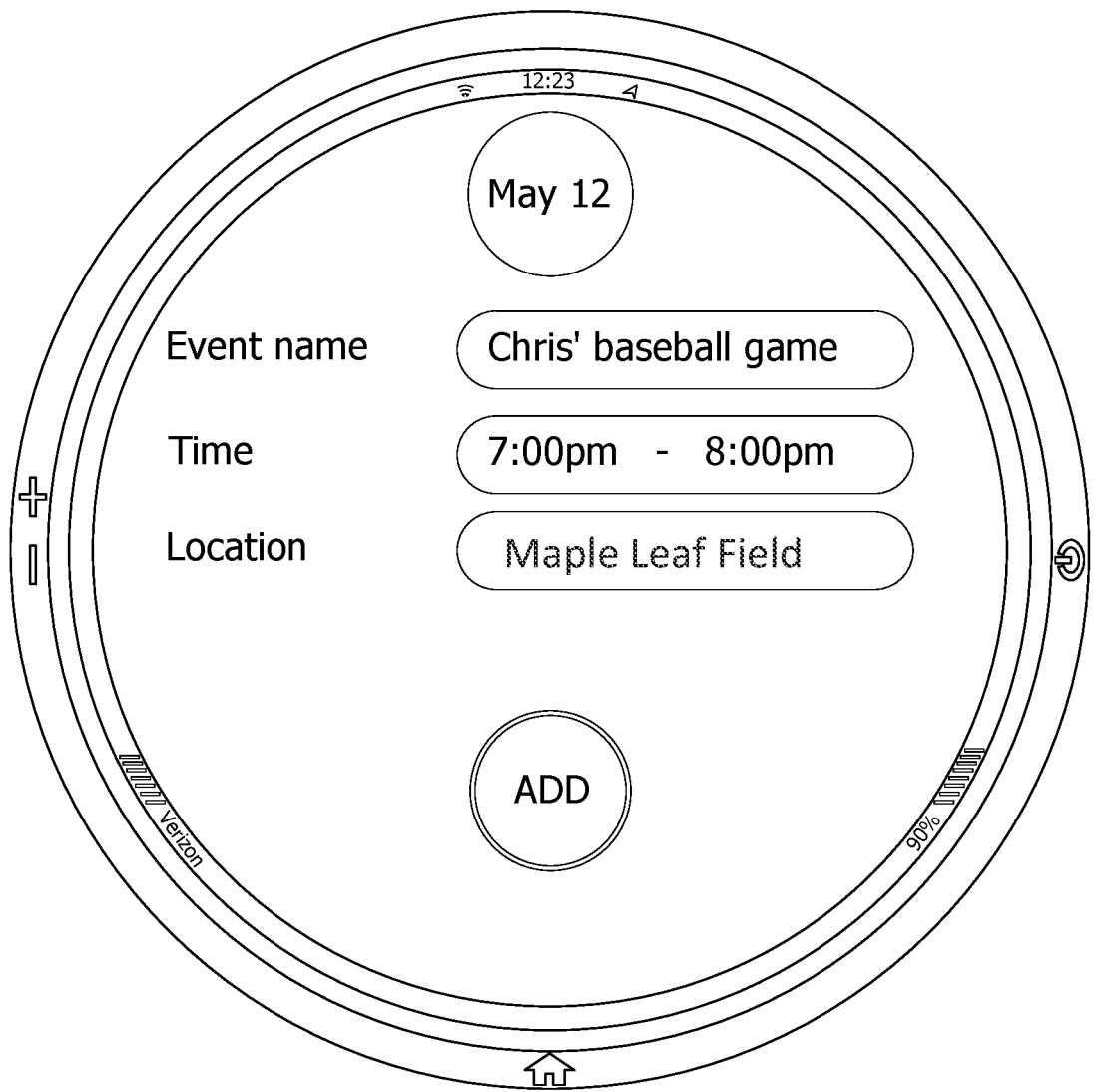
FIG. 14 illustrates another display of a calendar screen of the circular graphical user interface.
Figure 15:
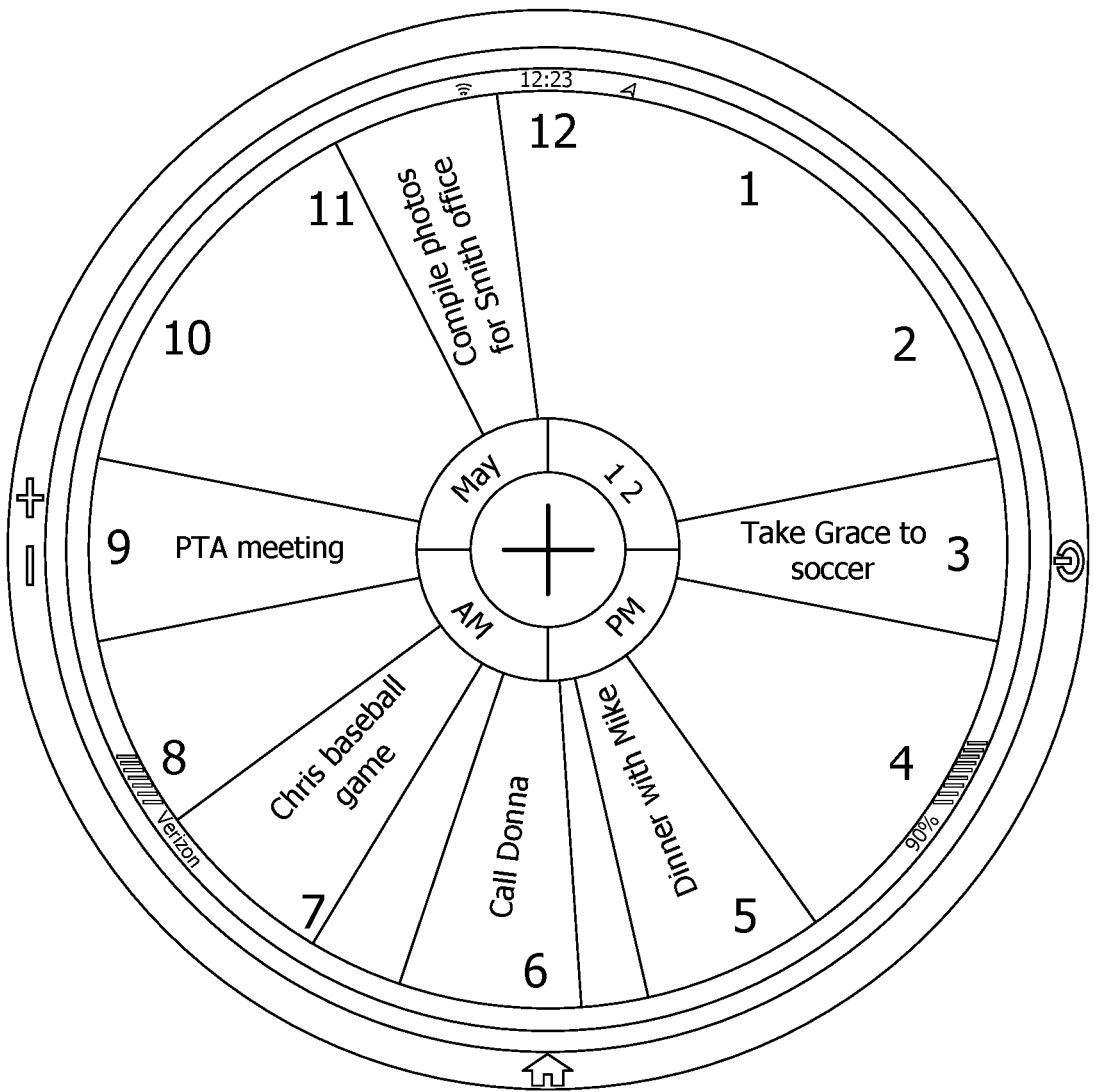
FIG. 15 illustrates another display of a calendar screen of the circular graphical user interface.

Circular graphical user interface 130 may present a soft button 135 in the form of a navigation option labeled "add new" whereby mobile communication system 100 may generate a circular graphical user interface 130 depicting an add event and/or data screen as shown in FIG. 13. Circular graphical user interface 130 may present the user with multiple text entry fields to enter information through input device 365, such as event name, time, and location and/or data 138, as shown in FIG. 14. Circular graphical user interface 130 may present a soft button 135 in the form of a Boolean option to add the event. Once added, circular graphical user interface 130 may display the newly added event in the list of events viewable in the monthly and daily calendar and/or data 138 views, as shown in FIG. 15.

Figure 16:
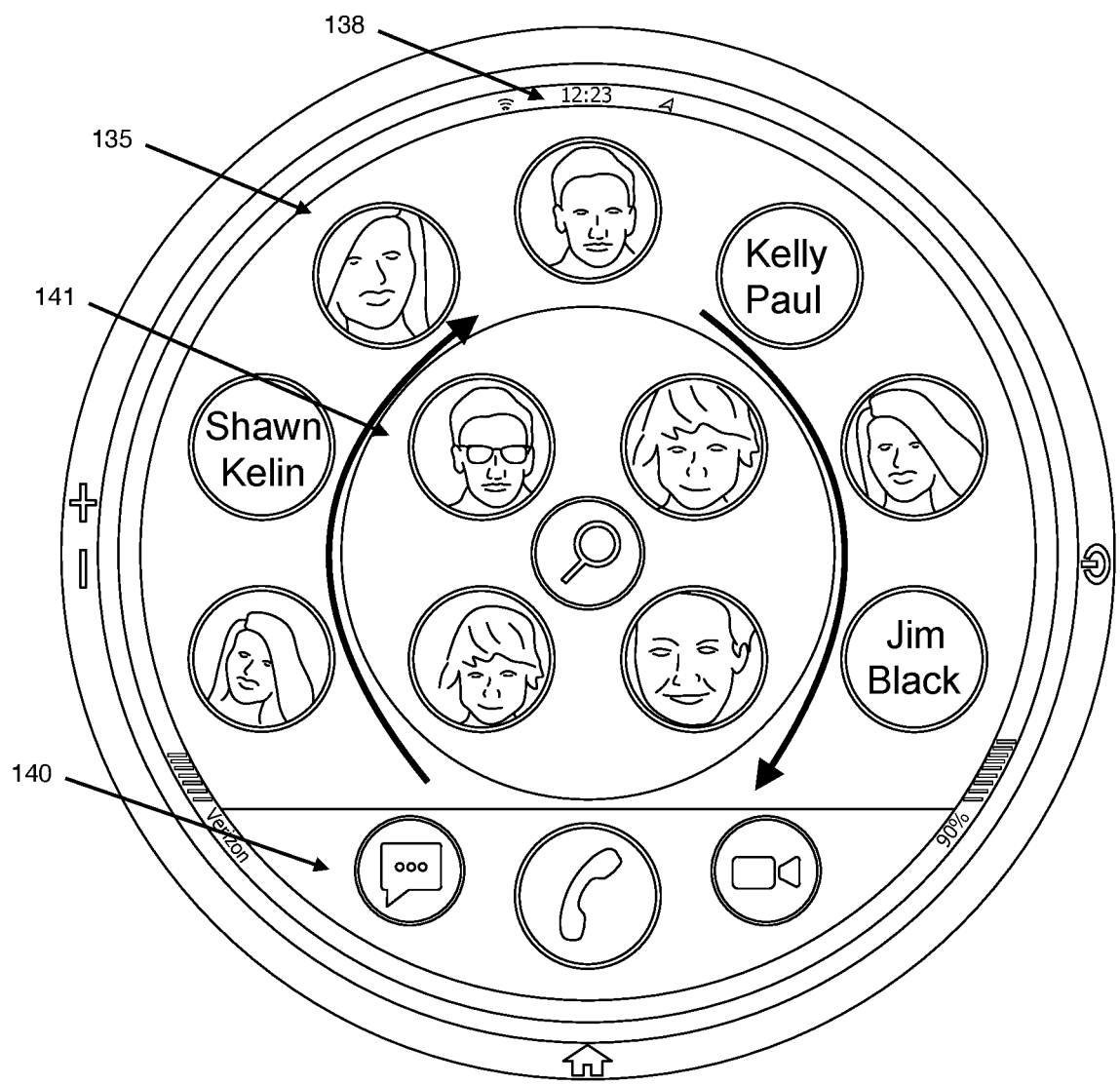
FIG. 16 illustrates a contact list screen of the circular graphical user interface.

Mobile communication system 100 may generate a user's contacts and/or data 138 that may be accessed from the home screen by a user tapping a navigation option soft button 135 indicated by the graphical representation of a contacts and/or data 138 button. The contacts and/or data 138 representing persons, businesses, or other entities as well as photographs selected by the user or synchronized and uploaded from a third-party application may be displayed through a circular graphical user interface 130 along the perimeter of the display as illustrated in FIG. 16. When accessing the contacts and/or data 138, the collection may be configured to be rotatable around the perimeter of the display area in a similar manner to the dial-based menu of the home screen whereby the contacts and/or data 138 appear from one side of the static bar 140 and disappear at the other side of the static bar 140 as the user slides their finger in a clockwise or counterclockwise motion.

Figure 17:
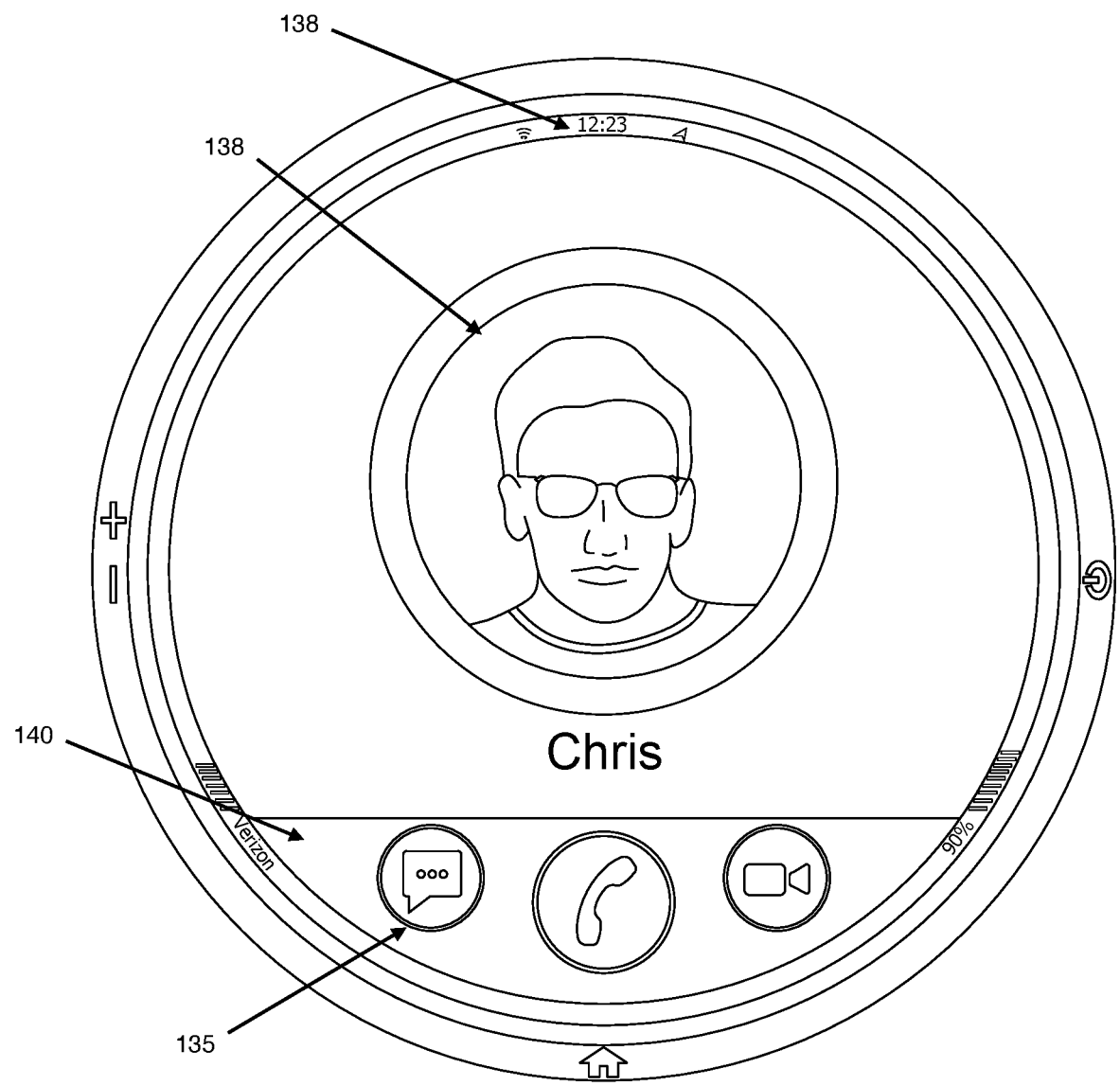
FIG. 17 illustrates a call screen of the circular graphical user interface.
Figure 18:
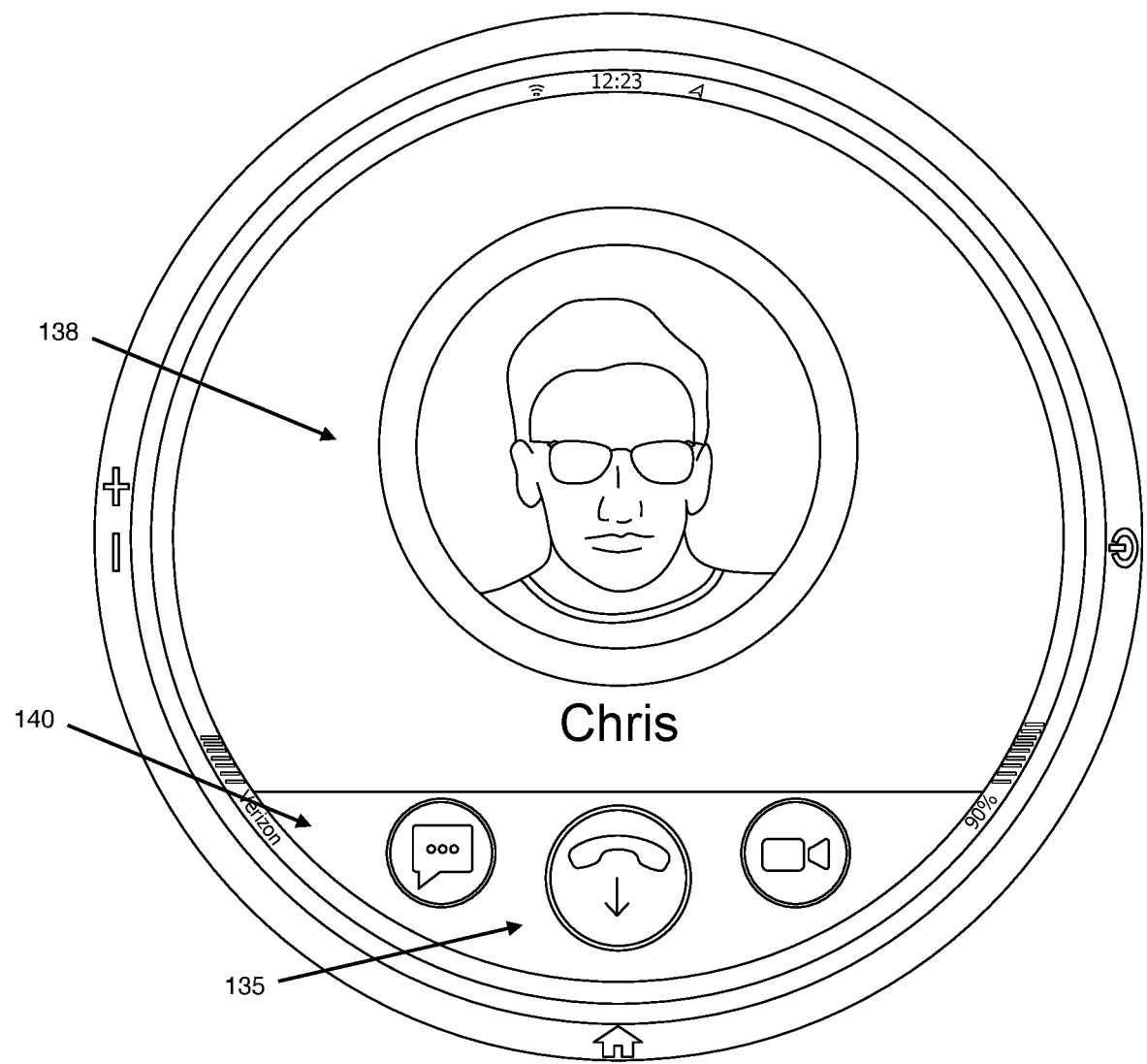
FIG. 18 illustrates another display of a call screen of the circular graphical user interface.

Mobile communication system 100 may generate an "inner circle" 141 that would display "favorite" contacts and/or data 138 that were selected to be favorites by the user whereby the favorite contacts and/or data 138 are always visible while user scrolls through the dial-based contact menu. Mobile communication device 110 may generate a static bar 140 that would display soft buttons 135 as navigation options to call a contact, message a contact, video call a contact, or access specific data 138 whereby when a contact and/or data 138 is selected by choosing one of these options the action may be carried out with that corresponding selection, as illustrated in FIG. 17-18

Figure 19:
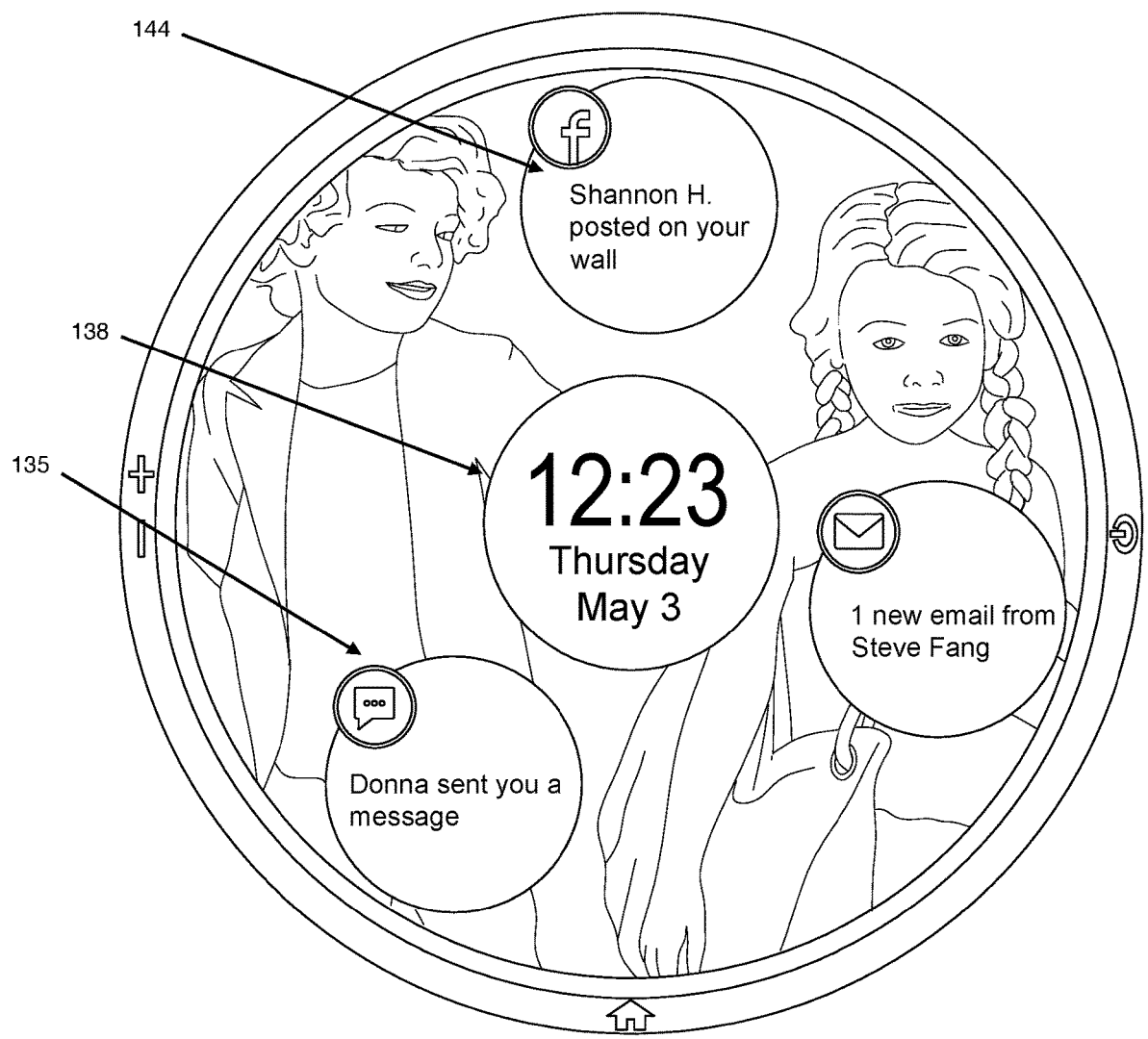
FIG. 19 illustrates a notification screen of the circular graphical user interface.

Mobile communication system 100 may generate a circular graphical user interface 130 depicting a notification screen, as illustrated in FIG. 19 whereby a picture selected by the user as well as data 138 and information relevant to the user may be displayed as round notification alerts 144 which behave as soft buttons 135 acting as navigational options for the respective applications of which the notifications belong. Mobile communication system 100 may awake while the processors are still dormant by showing incoming notification alerts 144 as they occur by coming alive only when Mobile communication device 110 is picked up from a surface such that the battery is not consumed as much.

Notification alerts 144 alert users of certain events. Mobile communication system 100 may generate a corresponding display based on preferences or selections by the user or may be predetermined by default. Notification alerts 144 may include various types alerts such as but not limited to news alerts, weather alerts, sports score updates, stock price alerts, transportation schedules, instant or chat messages, social networking updates, network connectivity and availability, or battery strength of a device associated with the user, as well as other information such as the geo-proximity of user's friend or contact or a nearby store.

Notification alerts 144 are uniquely round in shape; these notifications and alerts may be displayed in areas of the circular graphical user interface 130 and contain information from applications installed on the graphical user interface.

Figure 20:
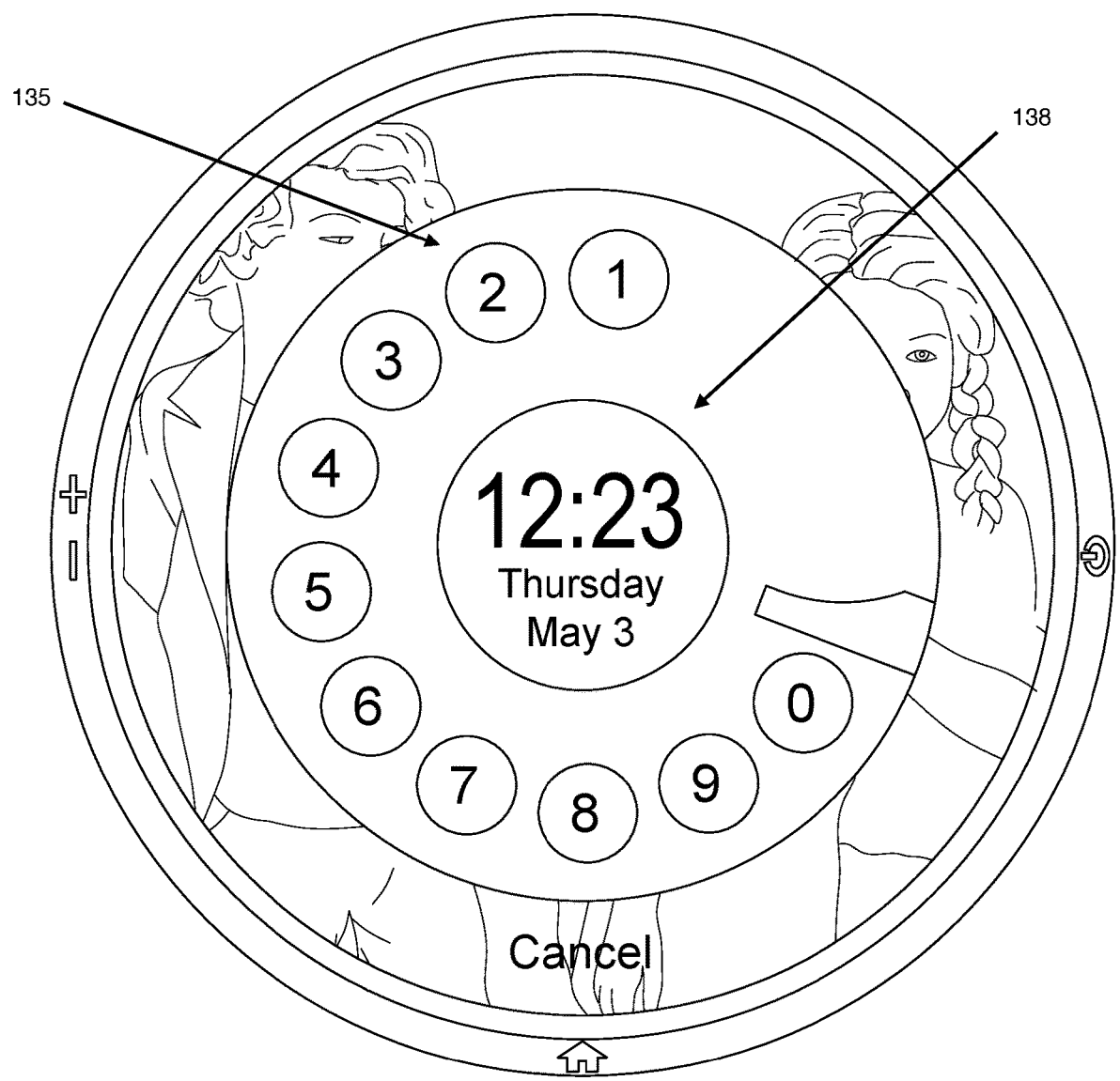
FIG. 20 illustrates a lock screen of the circular graphical user interface.

Mobile communication device 110 may generate a circular user interface 130 depicting a lock screen, as illustrated in FIG. 20, which may be accessed when the user wakes up mobile communication system 100 from a sleep mode or when mobile communication device 110 is powered on. The lock screen may have one or more soft buttons 135 indicated by the graphical representation of numbers such as 1, 2, 3, 4, 5, 6, 7, 8, 9, and 10 on a lock screen dial. In accordance with the concepts discussed, a user may insert a password to unlock mobile communication system 100 via circular graphical user interface 130 by entering various types of input or gestures corresponding to one or more commands, such as sliding their finger from one of the numbers to a second point on the dial similar to a rotary dial phone. For example, if the user wishes to insert the password 1 2 3 4 to unlock mobile communication system 100, user may place their finger on the soft button 135 signifying the number 1, and drag their finger to a point farther about the rotation axis and then repeats the process for the soft buttons 135 signifying number 2 then 3 then 4. Mobile communication system 100 analyzes and registers these inputs by the user and if the password matches the password chosen by the user, mobile communication system 100 unlocks.

Figure 21:
FIG. 21 illustrates a music player of the circular graphical user interface.
Figure 22:
FIG. 22 illustrates another display of a music player of the circular graphical user interface.

Mobile communication device 110 may generate a circular graphical user interface 130 depicting a music player screen that may be accessed from the home screen by a user tapping a soft button 135 indicated by the graphical representation of a music library button, whereby icons representing songs, albums, artists, genres, or other filters may be displayed. Mobile communication device 110 may generate a song display through circular graphical user interface 130 when user selects a specific song, as illustrated in FIG. 21. Mobile communication device 110 may generate a volume adjustment dial such as volume control bar 142 whereby a user may adjust a volume by circular graphical user interface 130 by entering various types of input or gestures corresponding to one or more commands, such as dragging their finger from one point on the dial to a second point on the circular control bar 142, as illustrated in FIG. 22. For example, if the user wishes to increase the volume of the music playing, they may place their finger on the volume's current point and drag their finger from the current volume's point to a point farther about the rotation axis to rotate the circular control bar 142 to the desired volume level. The user may also select the point along the circular control bar 142 that is the desired value on the dial for the volume.

Figure 23:
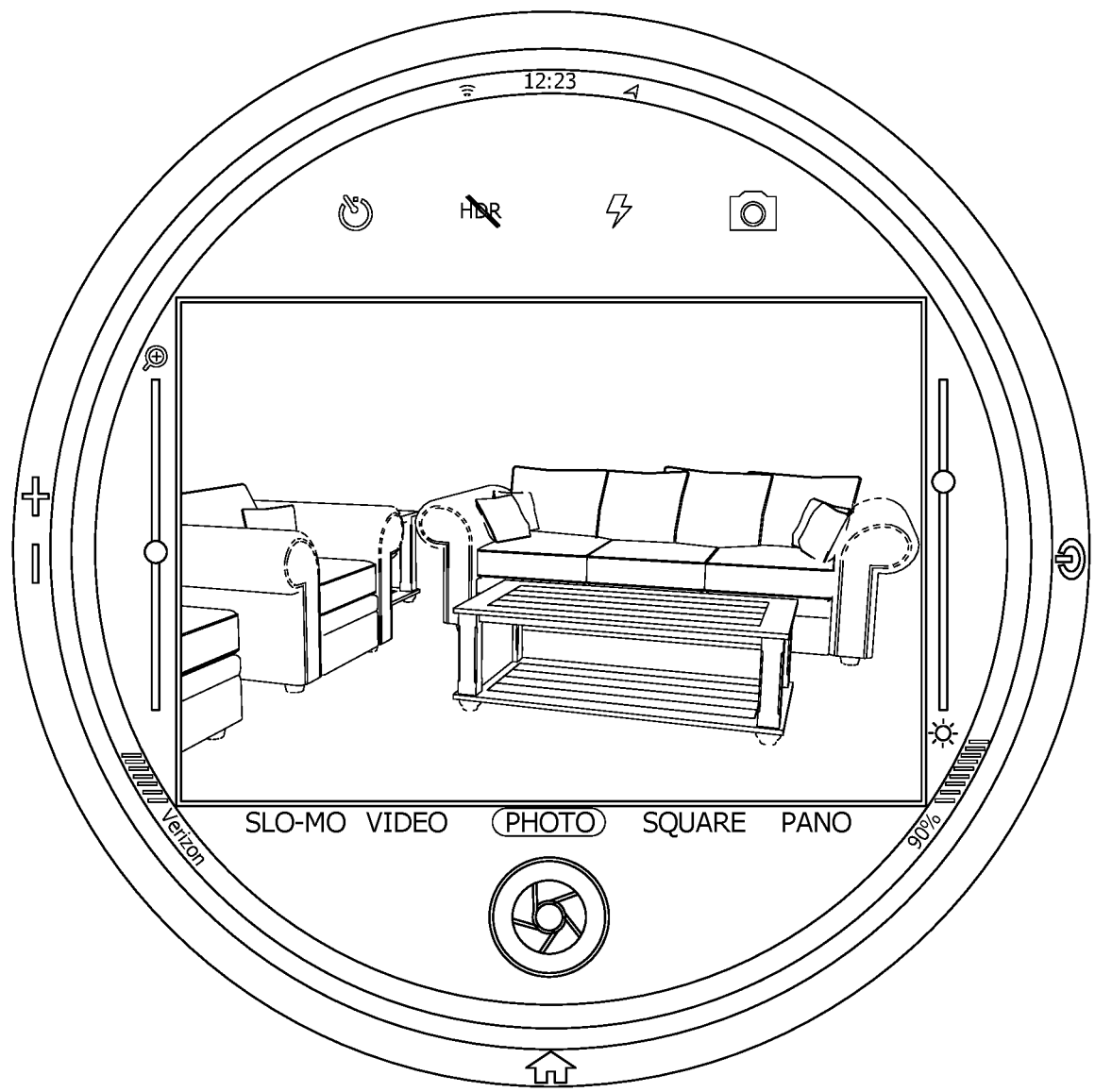
FIG. 23 illustrates a camera screen of the circular graphical user interface.

FIGS. 23-32 are other examples of the circular graphical user interface 130 generated by the mobile communication system 100 according to one or more embodiments. FIG. 23 is an illustration of a camera application for the circular graphical user interface 130. It demonstrates the visual layout for the user through the display when the user is taking a picture. In some embodiments, controls for enlarging and/or changing the brightness of the photo may be present.

Figure 24:
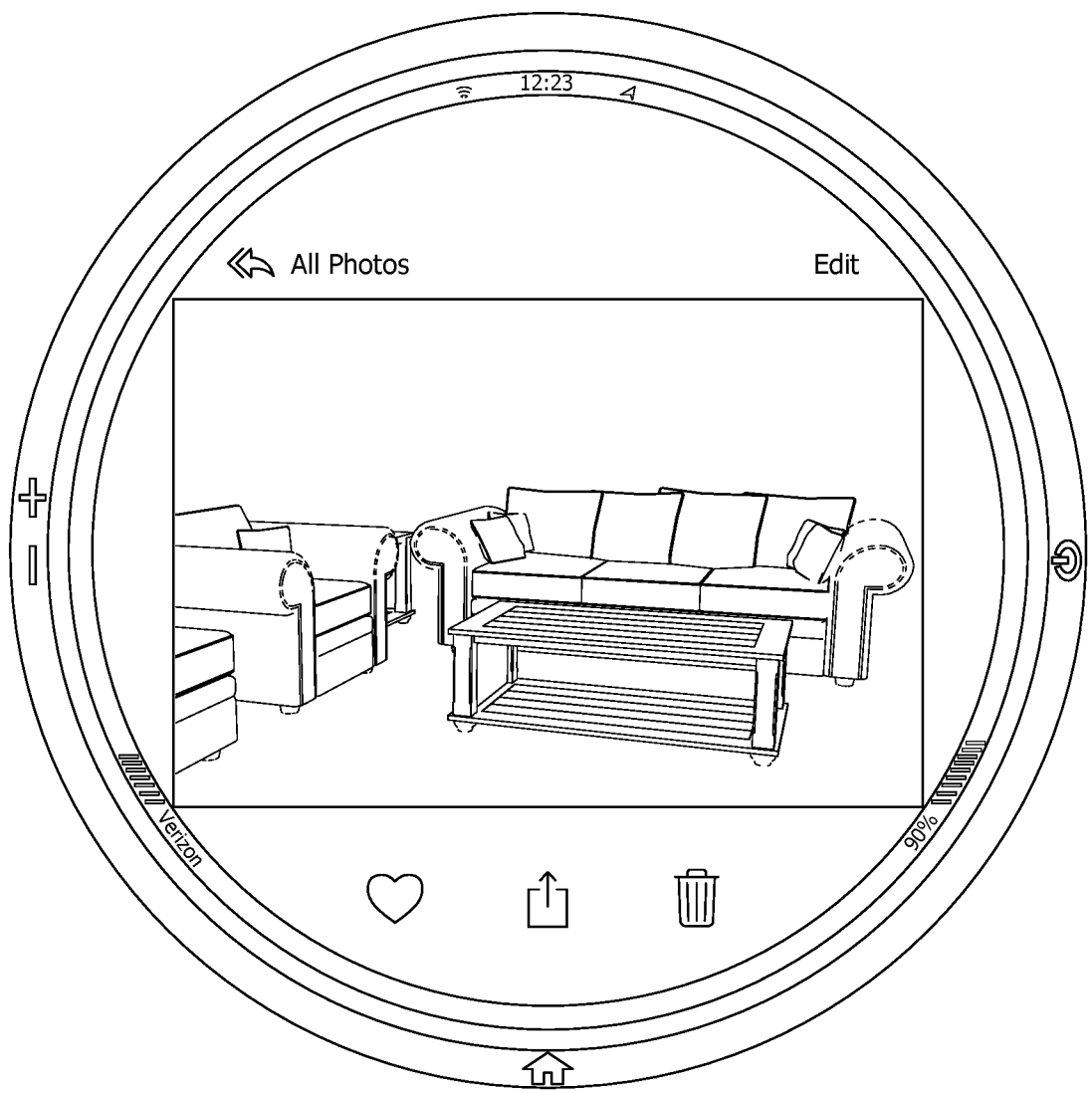
FIG. 24 illustrates a photograph album screen of the circular graphical user interface.

FIG. 24 is an illustration of a photo application for the circular graphical user interface 130. It demonstrates the visual layout for the user through the display when the user is viewing a picture that has been captured.

Figure 25:
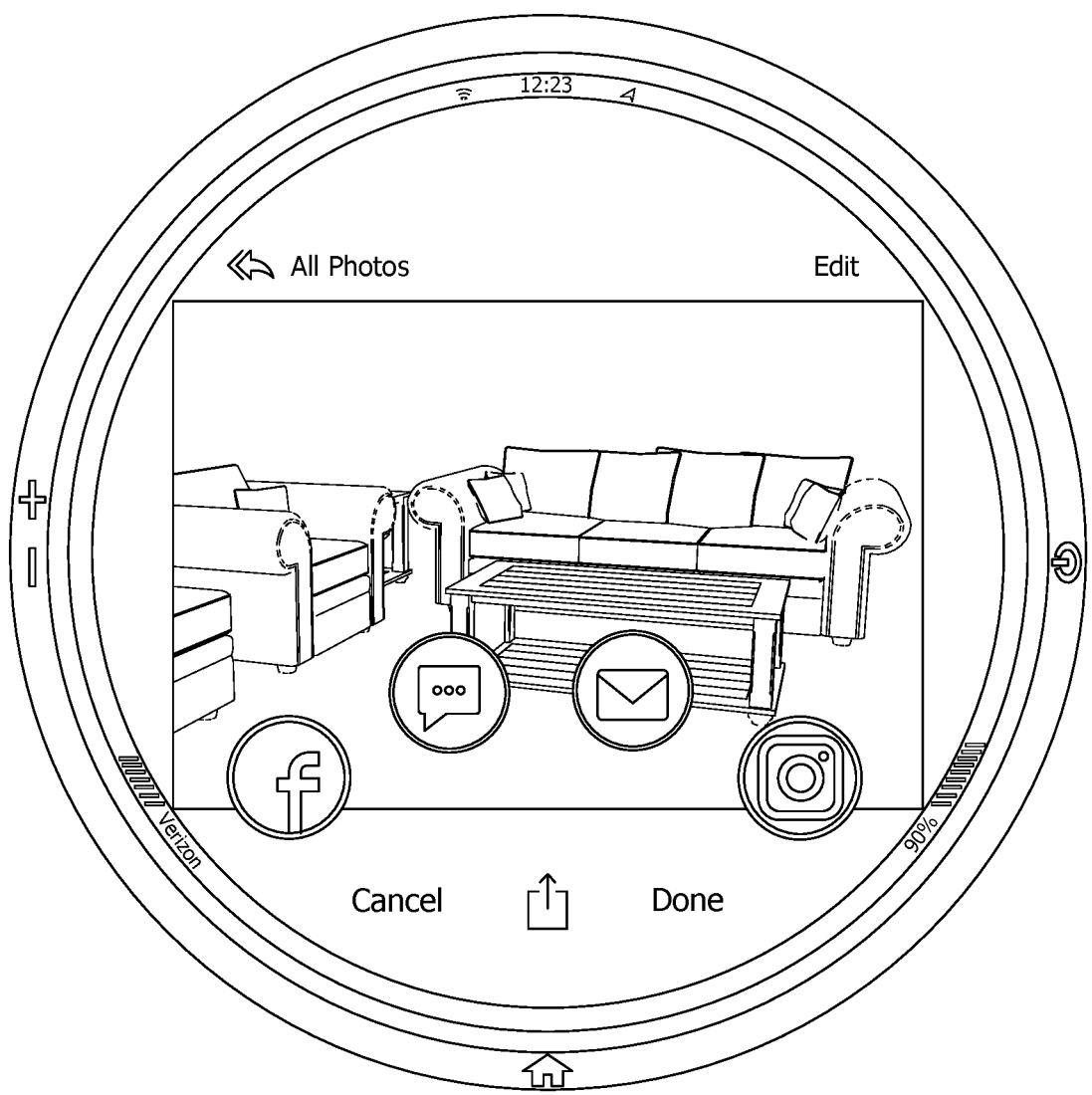
FIG. 25 illustrates another display of a photograph album screen of the circular graphical user interface.

FIG. 25 is an illustration of a photo transmission application for the circular graphical user interface 130. It demonstrates the visual layout for the user through the display when user is viewing a picture that has been captured and the mobile communication system 100 generates soft buttons 135 for navigation options to mail, text, send through social media, or otherwise transfer the captured picture, as well as a navigation option to take the user back to the camera application.

Figure 26:
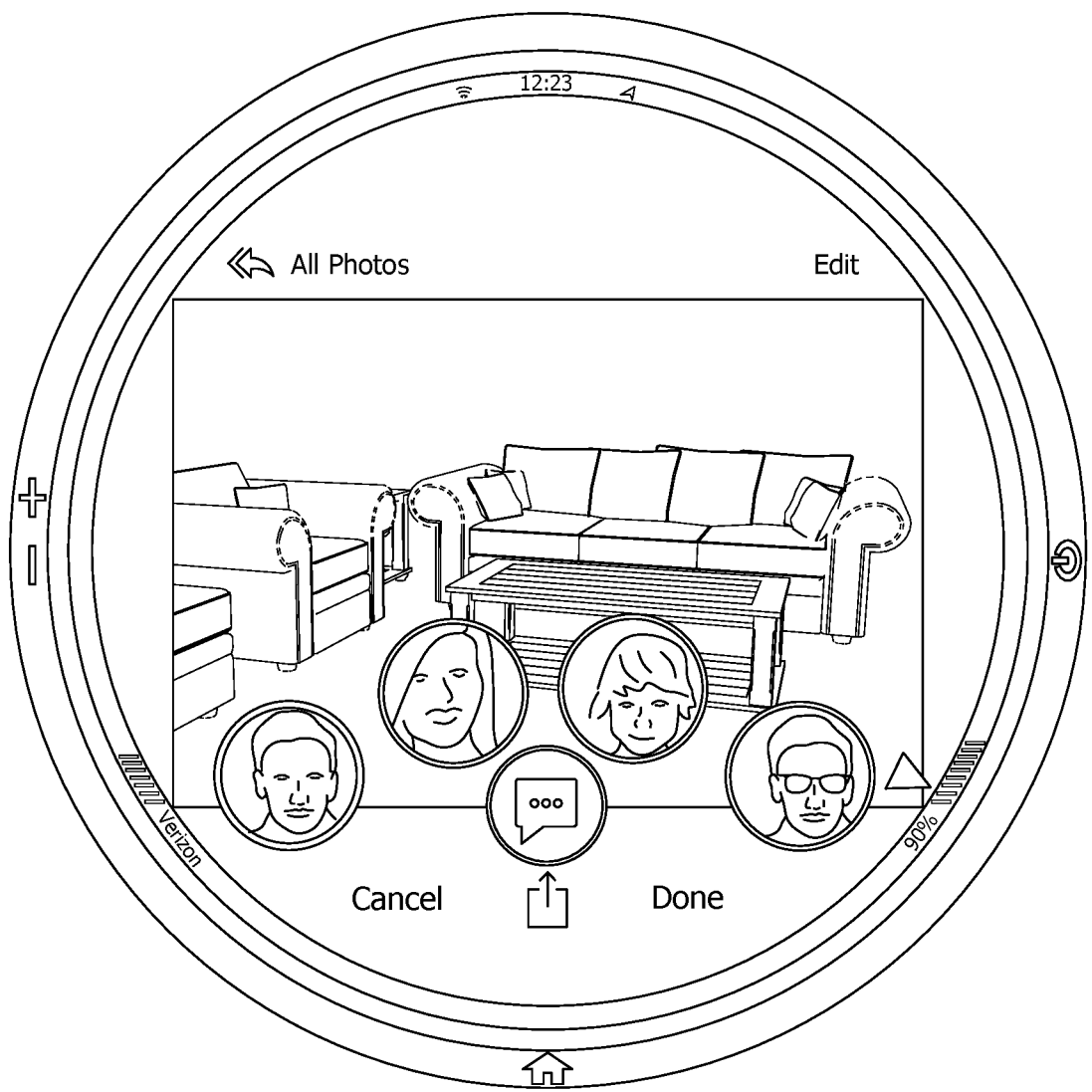
FIG. 26 illustrates another display of a photograph album screen of the circular graphical user interface.

FIG. 26 is an illustration of a photo library application for the circular graphical user interface 130. It demonstrates the visual layout for the user through the display when the user is viewing a picture that has been captured and has selected to text the captured photo whereby mobile communication system 100 may generate soft buttons 135 for navigation options to text captured picture to one or more contacts and/or data selections.

Figure 27:
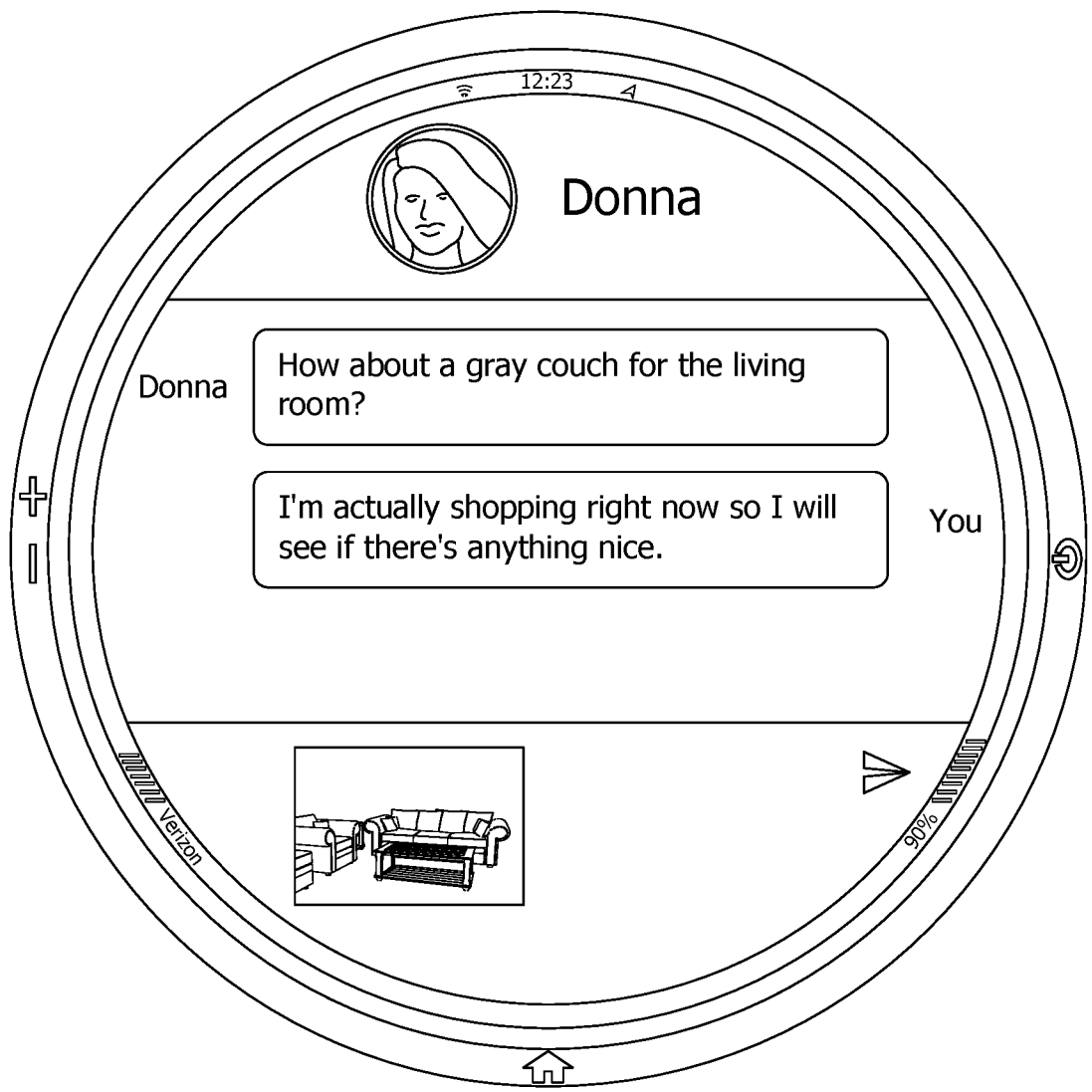
FIG. 27 illustrates a messaging screen of the circular graphical user interface.

FIG. 27 is an illustration of a messaging application for the circular graphical user interface 130. It demonstrates the visual layout for the user through the display when the user has selected a contact they wish to send the captured picture to whereby mobile communication system 100 may generate a text entry screen to insert text to be sent to the selected contact's mobile communication device or other computing device.

Figure 28:
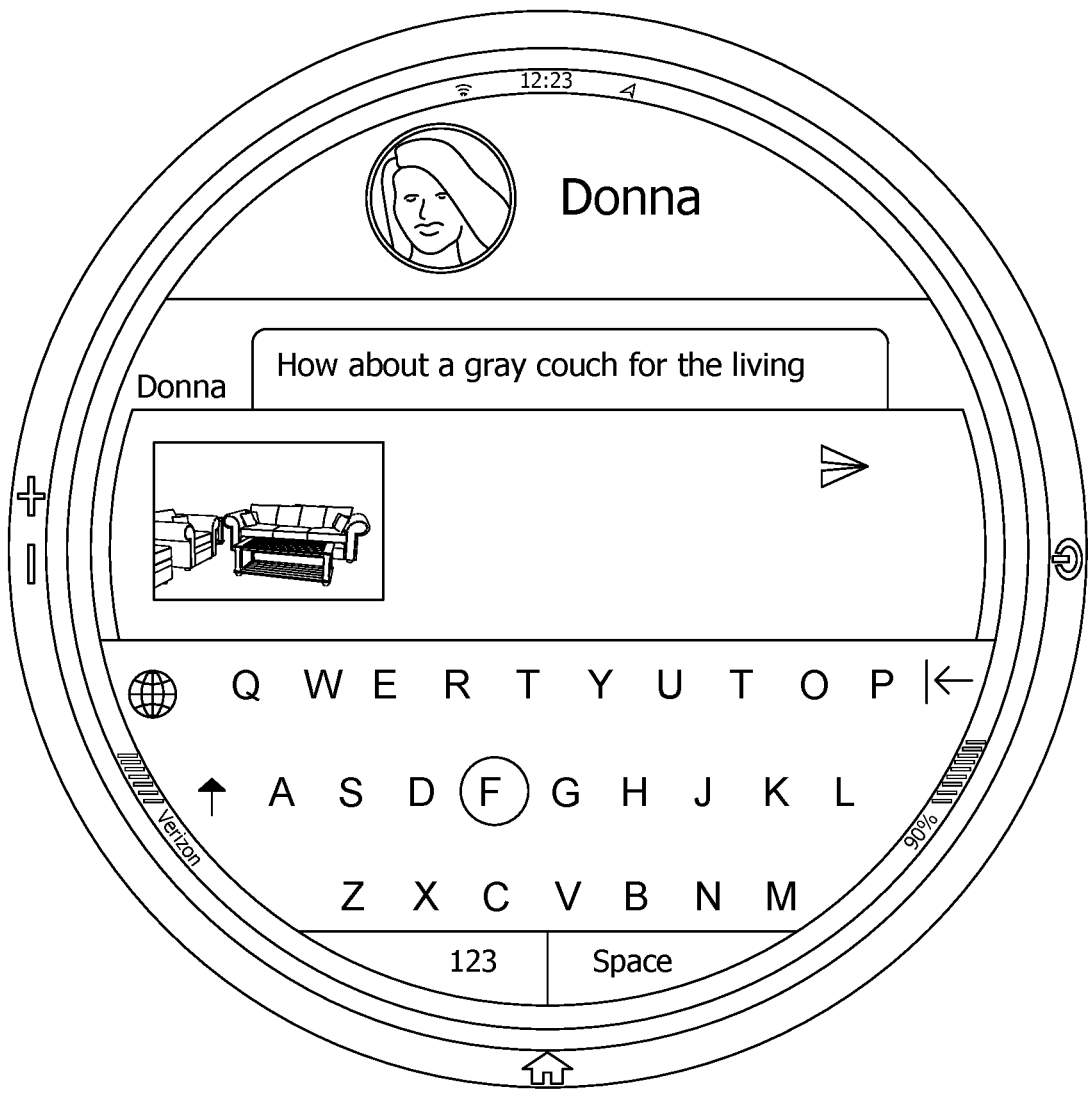
FIG. 28 illustrates another display of a messaging screen of the circular graphical user interface.

FIG. 28 is an illustration of a messaging application for the circular graphical user interface 130. It demonstrates the visual layout for the user through the display when the user has selected a contact they wish to send the captured picture to whereby mobile communication system 100 may generate a text entry screen to insert text to be sent to the contact's mobile communication device or other computing device. One example of a keyboard layout is displayed in FIG. 28.

Figure 29:
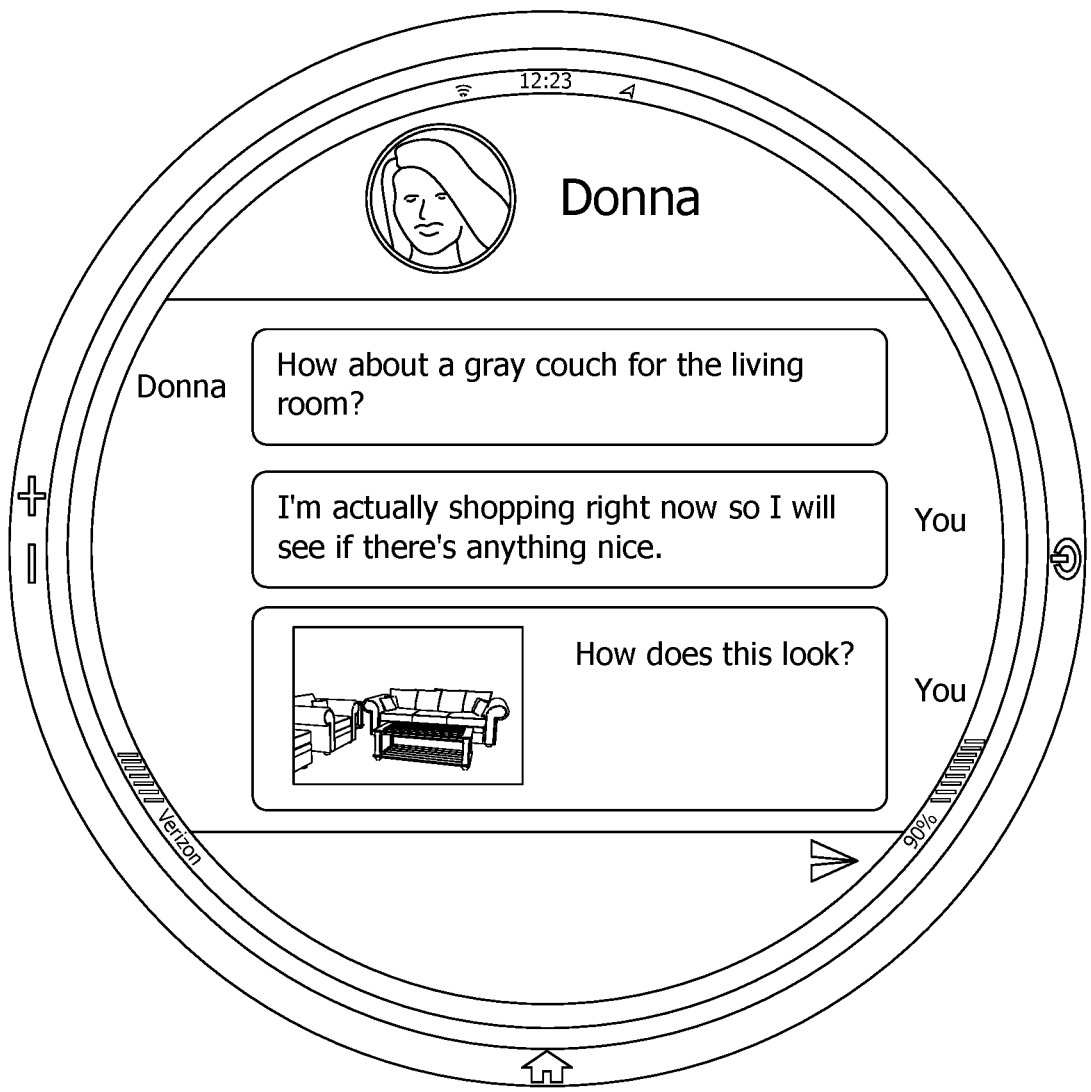
FIG. 29 illustrates another display of a messaging screen of the circular graphical user interface.

FIG. 29 is an illustration of a messaging application for the circular graphical user interface 130. It demonstrates the visual layout for the user through the display when the user is communicating with a contact whereby mobile communication system 100 may generate one or more text chat windows having text sent and received by user and contact including the captured picture.

Figure 30:
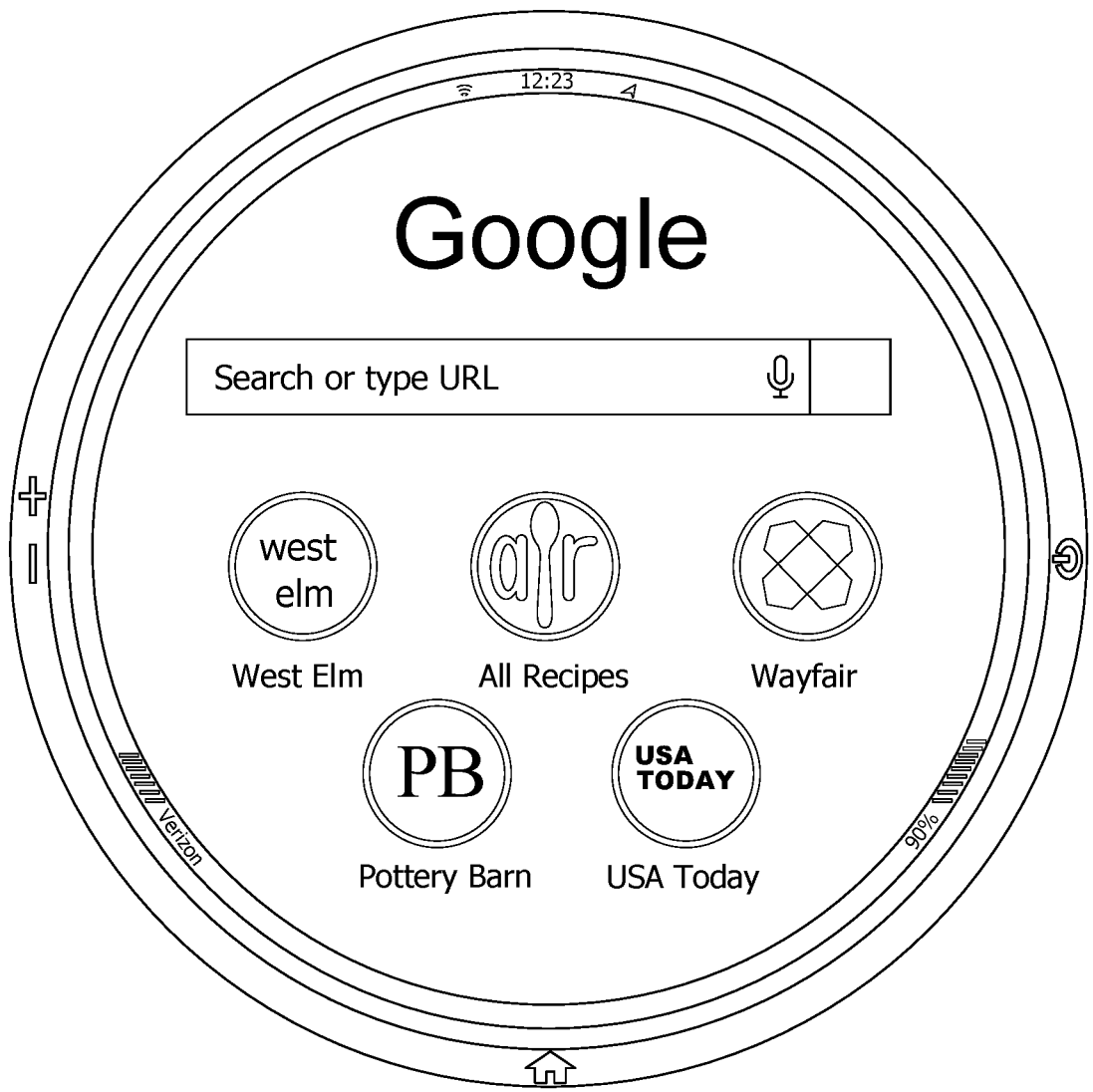
FIG. 30 illustrates a web browser screen of the circular graphical user interface.

FIG. 30 is an illustration of a web-browsing application for the circular graphical user interface 130. It demonstrates one embodiment of a visual layout for the user through the display when the user is browsing the Internet whereby mobile communication system 100 may generate one or more soft buttons 135 for navigation options to visit a favorite or frequently visited website.

Figure 31:
FIG. 31 illustrates another display of a web browser screen of the circular graphical user interface.

FIG. 31 is an illustration of a web-browsing application for the circular graphical user interface 130. It demonstrates one embodiment of a visual layout for the user through the display when the user is searching for grey couches through Google®, whereby mobile communication system 100 may generate one or more soft buttons 135 for navigation options to visit a website that was the result of a search, soft buttons 135 having additional data presented in the form of a summary of the data found from that website.

Figure 32:
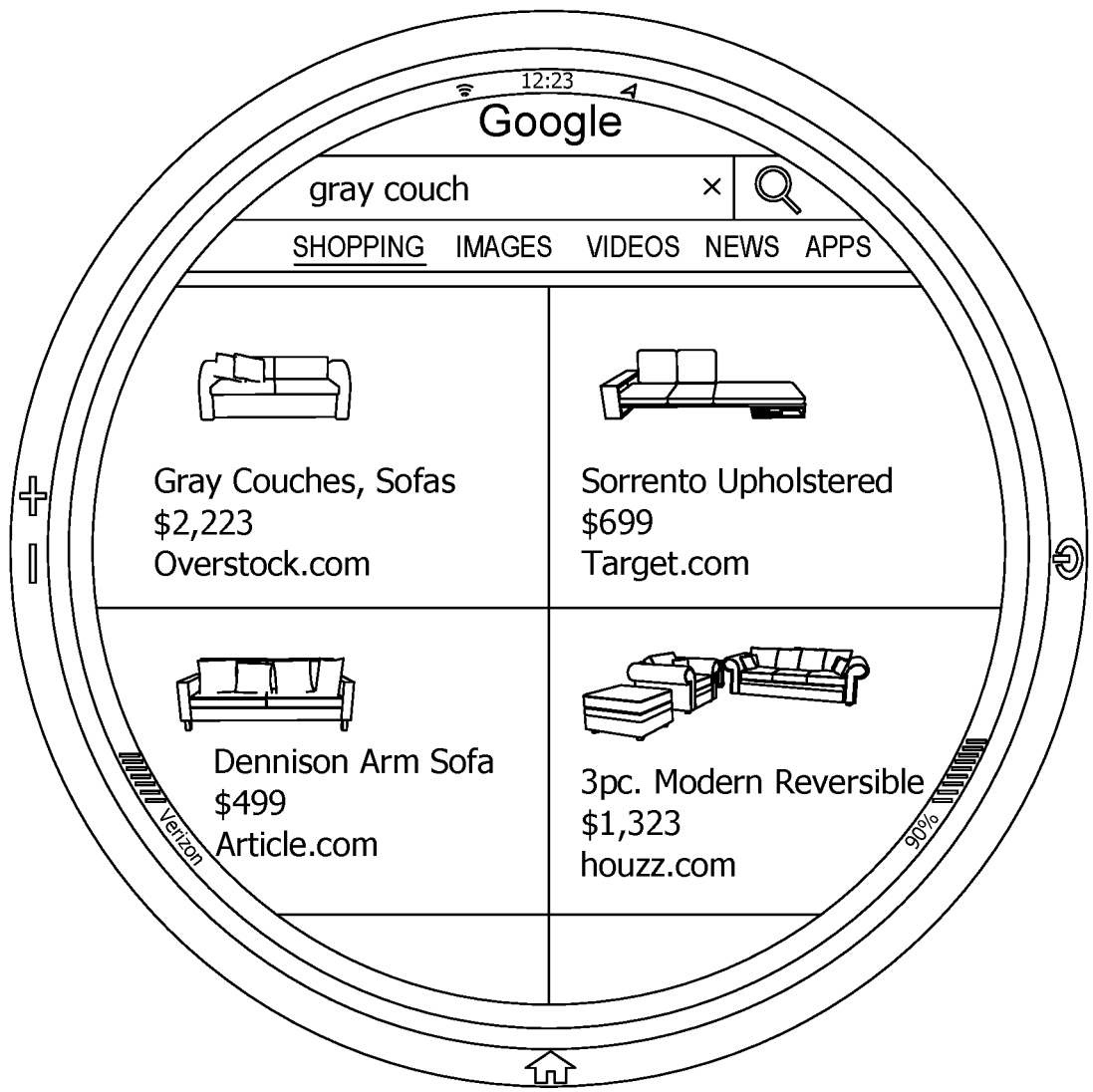
FIG. 32 illustrates another display of a web browser screen of the circular graphical user interface.

FIG. 32 is an illustration of a web-browsing application for the circular graphical user interface 130. It demonstrates one embodiment of a visual layout for the user through the display when user is searching for grey couches through Google® search shopping, whereby mobile communication system 100 may generate one or more soft buttons 135 for navigation options to visit a website that was the result of the shopping search, soft buttons 135 having additional data presented in the form of a picture and price from the website.

Figure 33:
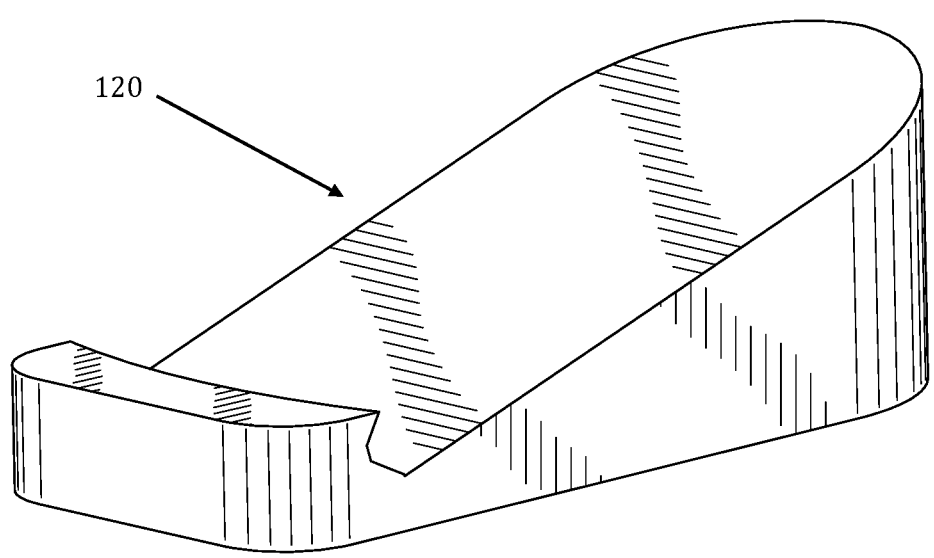
FIG. 33 illustrates a perspective view of a charging station.
Figure 34:
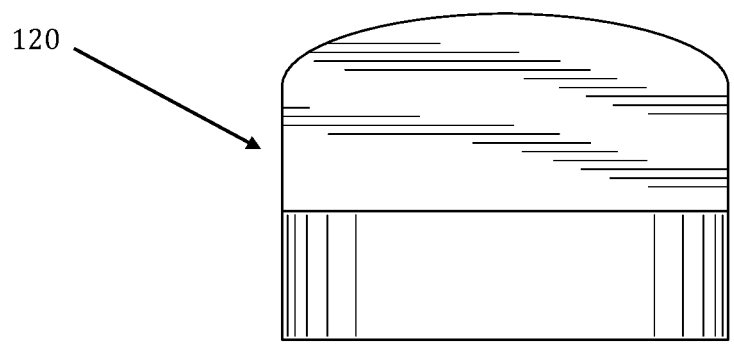
FIG. 34 illustrates a front view of the charging station.
Figure 35:
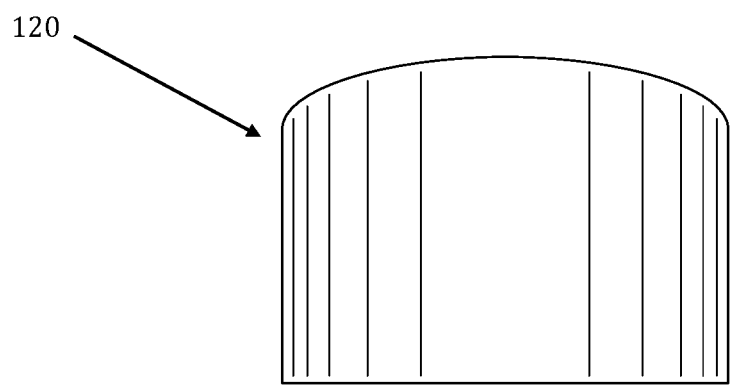
FIG. 35 illustrates a back view of the charging station.

FIG. 33-35 illustrate an embodiment of charging station 120 consistent with implementations described herein. The charging station 120 may be capable of supporting or cradling mobile communication system 100. In one or more non limiting embodiments, charging station 120 may support the mobile communication device 110 at an angle such that mobile communication device 110 may be presented at an angle to the base of charging station 120 to facilitate a better viewing angle.

Charging station 120 may be used to charge mobile communications device 110 or other communication devices. In one or more non-limiting embodiments charging station 120 may be used as a stand and/or cradle for the mobile communications device 110 or other communication devices. Charging station 120 may be designed at such an angle that a mobile communications device resting on it is positioned at a better angle for the user to view images on the mobile communications device Charging station 120 may include any suitable connection allowing a user to connect mobile communication device 110 to charging station 120 including wired or wireless technology known by those of ordinary skill in the art. The connection may be power cords so that a user may connect mobile communication device 110 to a power source in order to charge it. In another aspect, the connection may be via a docking station with charging station 120 specifically sized and shaped to be connectable to mobile communication device 110. In other embodiments, the connection may be a wireless charger, which transfers energy from the charger to a receiver in mobile communication device 110.

Charging station 120 may have a transformer to reconcile voltage and amperage variations between an electrical power source and the electrical power specifications of mobile communication device 110 when the charging station is configured to charge the mobile communication device 110 with a physical or wired connection. Charging station 120 may contain a set of indicators, such as but not limited to light emitting diodes (LEDs). The indicators may provide status notifications for charging station 120, for example when mobile communication device 110 is currently charging or when an error has occurred. The indicators may transmit different colored light depending on the notification and may also provide visual or audible signals.

Charging station 120 may communicate with other devices via communication links, such as USB (Universal Serial Bus) or HDMI/VGA (High-Definition Multimedia Interface/Video Graphics Array). For example, charging station 120 may use a Universal Serial Bus (USB) or other connection methods to connect to mobile communications systems 100, computers, wall outlets, and/or other devices. Charging station 120 may utilize additional input devices 365 and Other I/O 375 in the form of examples such as a speaker, smart speaker, microphone, headphone jack, indicator lights, and vibrational motor.

Figure 36:
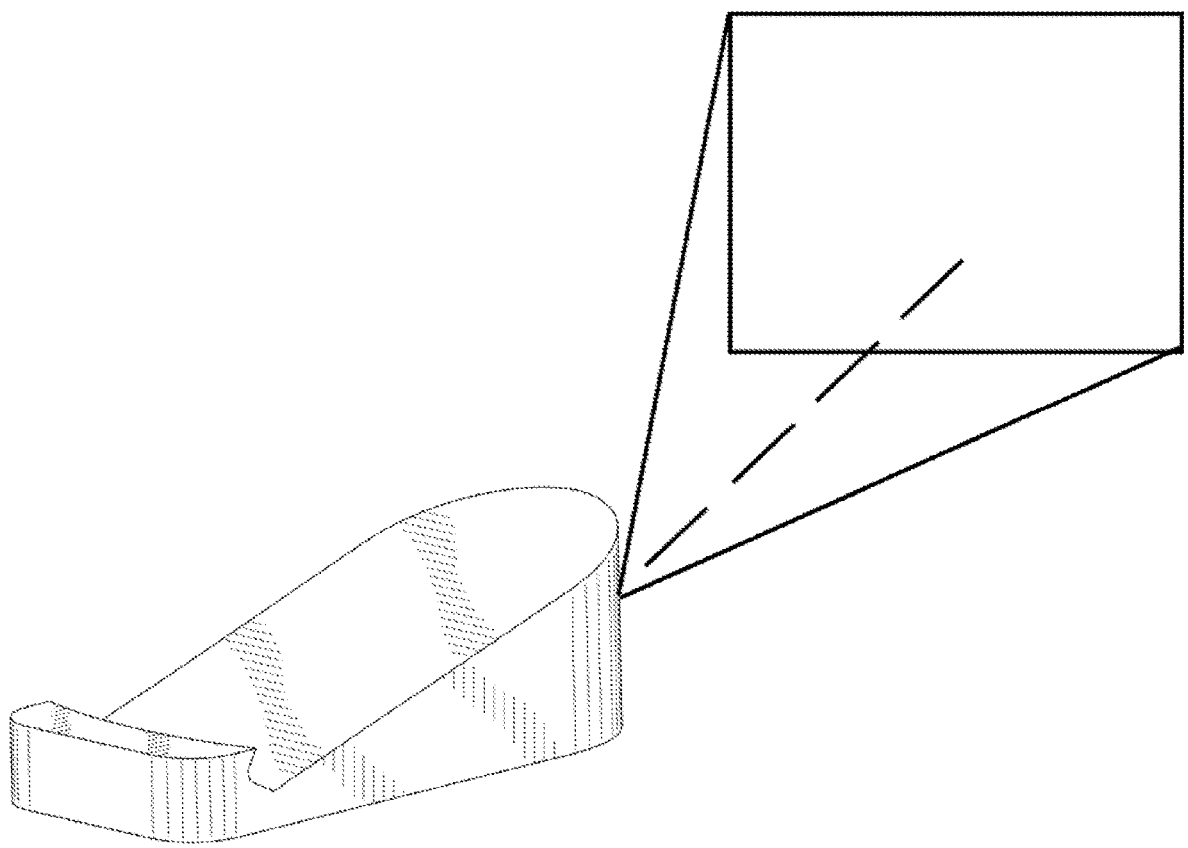
FIG. 36 illustrates the projector capabilities of charging station.

Charging station 120 also may include local wireless circuitry, which may enable short-range communication to another device. The local wireless circuitry could communicate on any wireless protocol, such as infrared, Bluetooth, IEEE 802.11, or some other local wireless communication protocol. Charging station 120 may have circuitry that may communicate with networks such as Wi-Fi. Charging station 120 may also have a built-in projector whereby the images projected may be communicated from the mobile communications system 100, from other devices, and/or from other networks as illustrated in FIG. 36.

The present invention, utilizing a circular viewing area, facilitates larger screen display sizes without increasing the width dimensions beyond a comfortable size or shape to fit in a person's hand and/or pocket. The present invention also allows nonlinear formats in an efficient fashion that improves a viewer's focus, reduces cognitive load, and maximizes both the display size and display shape.

The foregoing description of illustrated embodiments of the systems and methods is not intended to be exhaustive or to limit the systems and methods to the precise forms disclosed. While specific embodiments of and examples for the systems components and methods are described herein for illustrative purposes, various equivalent modifications are possible within the scope of the systems, components, and methods, as those skilled in the relevant art will recognize. The teachings of the systems and methods provided herein can be applied to other processing systems and methods, not only for the systems and methods described above. The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. On a mobile communications system for storing and manipulating information, a computer implemented method of representing one or more circular graphical user interfaces on a circular display, the method comprising:

displaying an initial portion of one or more initial indicators in an arc on a single page of an initial circular graphical user interface, each corresponding to at least one stored application on the mobile communications system, each of the one or more initial indicators being uniquely identified by an image on the initial circular graphical user interface, each of the one or more initial indicators at a location arranged within a middle annulus in a major segment of the initial circular graphical user interface;

while displaying the one or more initial indicators, displaying one or more secondary indicators on the single page of the initial circular graphical user interface, each corresponding to at least one secondary stored application on the mobile communications system, each of the one or more secondary indicators being displayed as the image on the initial circular graphical user interface, each of the one or more secondary indicators at a location in a minor segment of the initial circular graphical user interface, wherein the one or more secondary indicators have been set as a favorite application by an end user and remain static on the initial circular graphical user interface;

while displaying the one or more initial indicators in the middle annulus of the major segment and one or more secondary indicators in the minor segment and displaying one or more tertiary indicators in an outer annulus of the major segment, displaying a control bar located in between the outer annulus and the middle annulus which the user can manipulate to control the movement of the initial indicators;

receiving a user input for requesting display of one or more hidden initial indicators in response to an arching control gesture with an input device of the mobile communication system; and in response to the user input, displaying one or more hidden initial indicators on the single page of the initial circular graphical user interface in a manner so as to obscure the one or more initial indicators originally displayed when the one or more initial contact indicators rotate in an arching motion behind the minor segment while continuing to display the one or more secondary indicators on the single page of the initial circular graphical user interface, and now displaying the one or more hidden initial indicators on the single page of the initial circular graphical user interface.

2. The method of claim 1 further comprising:

receiving the user input for accessing an application corresponding to the one or more initial indicators or the one or more secondary indicators by a secondary control gesture;

providing a control bar positioned around the initial indicators, the control bar illustrating the status of rotation through the one or more initial indicators; and in response to receiving the user input for entering the application by the secondary control gesture, displaying a secondary circular graphical user interface.

3. The method of claim 1, wherein receiving the user input for requesting display of another portion of the one or more initial indicators in response to a control gesture with the input device of the mobile communication system further comprises: wherein the primary control gesture is a swipe or drag gesture in an arching movement.

4. The method of claim 1 further comprising:

displaying a central indicator on the initial circular graphical user interface, the central indicator displaying stored application supplied data and formulas operative on the stored application supplied data, the central indicator at a location arranged in the center of the major segment of the initial circular graphical user interface wherein the annulus is rotated around a central indicator on the initial circular graphical user interface; and displaying one or more tertiary indicators on the initial circular graphical user interface, the one or more tertiary indicators indicator displaying system data, the one or more tertiary indicators at a location arranged on the outer annulus of the major segment of the initial circular graphical user interface.

5. The method of claim 1 further comprising: displaying a portion of one or more initial calendar indicators on a calendar circular graphical user interface, each corresponding to at least one month, each of the initial calendar indicators being uniquely identified by text on the calendar circular graphical user interface, each of the initial calendar indicators at a location arranged around the middle annulus in a major segment of the calendar circular graphical user interface;

while displaying the one or more initial calendar indicators, displaying one or more secondary calendar indicators on the calendar circular graphical user interface, each corresponding to user-settable inputted event data, each of the one or more secondary calendar indicators being displayed as text on the calendar circular graphical user interface, each of the secondary calendar indicators at a location in a minor segment of the calendar circular graphical user interface wherein the minor segment is at a vertical and bottom end of the calendar circular graphical user interface;

receiving the user input for requesting display of another portion of the one or more initial calendar indicators in response to the initial control gesture with the input device of the mobile communication system; and in response to receiving the user input for requesting display of one or more hidden initial calendar indicators in response to the initial control gesture with the input device of the mobile communication system, displaying the one or more hidden initial calendar indicators on a single page of the calendar circular graphical user interface in a manner so as to obscure one or more initial calendar indicators originally displayed when the one or more initial calendar indicators rotate behind the minor segment on the single page of the calendar circular graphical user interface.

6. The method of claim 5 further comprising:

receiving the user input for selecting an initial calendar indicator of the one or more initial calendar indicators by a secondary control gesture; and in response to the receiving the user input for selecting the initial calendar indicator of the one or more initial calendar indicators by the secondary control gesture, displaying one or more third calendar indicators corresponding to days of the month, the one or more third calendar indicators in the center of the major segment of the calendar circular graphical user interface, whereby the one or more initial calendar indicators rotate around the one or more third calendar indicators.

7. The method of claim 6 further comprising:

receiving the user input for selecting a third calendar indicator of the one or more third calendar indicators by the secondary control gesture; and in response to the receiving the user input for selecting the third calendar indicator of the one or more third calendar indicators by the secondary control gesture, displaying a set of secondary calendar indicators of the one or more secondary calendar indicators corresponding to the selected third calendar indicator.

8. The method of claim 7 further comprising:
receiving the user input for selecting a fourth calendar indicator on the calendar user circular graphical interface by the secondary control gesture, and
in response to receiving the user input selecting the fourth calendar indicator by the secondary control gesture, displaying a secondary calendar circular graphical user interface that is a circular clock, wherein secondary calendar indicators are of a thickness ratio on the circular clock in response to the duration of a corresponding event on a specific date corresponding to the selected third calendar indicator.

9. The method of claim 8 further comprising:
displaying an add indicator on the secondary calendar circular graphical user interface at the center of the circular clock;
receiving the user input for selecting the add indicator by the secondary control gesture; and
in response to receiving the user input for selecting the add indicator by the secondary control gesture, displaying a third calendar circular graphical user interface for receiving data/information to create additional user inputted secondary calendar indicators to one or more corresponding second events.

10. The method of claim 9 further comprising: displaying a keyboard on the minor segment of the third calendar circular graphical user interface.

11. The method of claim 1 further comprising: displaying a portion of one or more initial contact indicators on a contacts circular graphical user interface, each corresponding to at least one stored data of an entity, each of the initial contact indicators being uniquely identified by a stored image corresponding to the entity, each of the initial contact indicators at a location arranged within a middle annulus in a major segment of the contacts circular graphical user interface;
while displaying the one or more initial contact indicators, displaying one or more secondary contact indicators in the center of the major segment of the contacts circular graphical user interface, each corresponding to a favorited secondary entity by the end user, each of the one or more secondary contact indicators being displayed as an image on the contacts circular graphical user interface corresponding to the initial entity, each of the secondary contact indicators inside the one or more initial contact indicators located in the middle annulus in the major segment on the contacts circular graphical user interface;
receiving the user input for requesting display of one or more hidden initial contact indicators in response to the initial control gesture with the input device of the mobile communication system; and
in response to the user input for requesting display of one or more hidden initial contact indicators in response to the initial control gesture with the input device of the mobile communication system, displaying one or more hidden initial contact indicators on a single page of the contacts circular graphical user interface in a manner so as to obscure one or more initial contact indicators originally displayed in the middle annulus of the major segment on the single page the contacts circular graphical user interface when the one or more initial contact indicators rotate behind the minor segment while continuing to display the secondary contact indicators in the center of the single page of the contacts circular graphical user interface.

12. The method of claim 11 further comprising:
displaying one or more communication indicators corresponding to one or more communication methods, the one or more communication indicators positioned on the minor segment of the contacts circular graphical user interface;
receiving the user input for selecting a contact indicator of the one or more initial contact indicators or a secondary contact indicator of the one or more secondary contact indicators and a communication indicator of the one or more communication indicators by one or more secondary control gestures; and
in response to the user input for selecting the initial contact indicator of the one or more initial contact indicators or a secondary contact indicator of the one or more secondary contact indicators and a communication indicator by the one or more secondary control gestures, initiating communication with the entity by a corresponding communication method of the one or more communication methods.

13. The method of claim 12 further comprising:
displaying a search indicator on the contacts circular graphical user interface, the search indicator positioned inside of the one or more secondary contact indicators on the contacts circular graphical user interface;
receiving the user input for selecting the search indicator by the one or more secondary control gestures; and
in response to the receiving the user input for selecting the search indicator by the one or more secondary control gestures, displaying a secondary contacts circular graphical user interface for receiving additional user inputted search criteria to find a specific entity.

14. The method of claim 1 further comprising: displaying a lock screen circular graphical user interface with a central time indicator, the lock screen circular graphical user interface having one or more lock screen indicators positioned around the central time indicator, the lock screen indicators having stored application supplied data and formulas operative on said application supplied data for display in the form of information and interactive soft buttons including notifications corresponding to the lock screen indicators; and
displaying a music circular graphical user interface, the music circular graphical user interface having one or more music control indicators corresponding to control manipulation of one or more song, the one or more music control indicators located in a minor segment of the music screen circular graphical user interface wherein a major segment has stored application supplied data and formulas operative on said application supplied data.

15. The method of claim 14 further comprising: displaying a volume indicator on the music circular graphical user interface, the volume indicator at a location arranged around a volume bar annulus in the major segment of the music circular graphical user interface;
receiving the user input for requesting an alteration of a volume in response to the initial control gesture with the input device of the mobile communication system; and
in response to the user input for requesting the alteration of the volume, altering the volume and moving the volume indicator based on a location where the initial control gesture ended.

16. The method of claim 4, further comprising: displaying application program data such as a weather illustration as the central indicator on the initial circular graphical user interface that has been selected by the end user, and displaying application program data including time, battery level, and signal strength of the mobile communication system as the one or more tertiary indicators located on the outer annulus of the major segment of the initial circular graphical user interface.

17. The method of claim 1 further comprising: displaying a phone circular graphical user interface, the phone circular graphical user interface having one or more number indicators corresponding to numbers in a phone number; and
    receiving the user input for requesting to dial a phone number having an initial number indicator in response to the initial control gesture with the input device of the mobile communication system, wherein the initial control gesture is a circular swiping gesture (on the lock screen) or pressing (on the call screen) on the initial number indicator.

18. A circular shaped mobile communications system for storing and manipulating information, the circular shaped mobile communications system having one or more processors to display a circular graphical user interface on a display, the circular graphical user interface configured for:
    displaying a portion of one or more initial indicators in an arc on a single page of an initial circular graphical user interface, each corresponding to at least one stored application on the mobile communications system, each of the one or more initial indicators being uniquely identified by an image on the initial circular graphical user interface, each of the one or more initial indicators at a location arranged within an annulus located in a major segment of the initial circular graphical user interface;
    while displaying one or more initial indicators, displaying one or more secondary indicators on the single page of the initial circular graphical user interface, each corresponding to at least one secondary stored application on the mobile communications system, each of the one or more secondary indicators being displayed as an image on the initial circular graphical user interface, each of the one or more secondary indicators at a location in a minor segment of the initial circular graphical user interface, wherein the one or more secondary indicators-have an end-user favorite setting and remain static on the initial circular graphical user interface; wherein the major segment and minor segment are separated by a chord of a circle;
    receiving user input for requesting display of one or more hidden initial indicators in response to an arching control gesture with the input device of the mobile communication system; and
    in response to receiving the user input, displaying one or more hidden initial indicators on the single page of the initial circular graphical user interface that move in arching motion behind the minor segment in a manner so as to obscure one or more initial indicators previously displayed while continuing to display the one or more secondary indicators and now displaying the one or more hidden initial indicators on the single page of the initial circular graphical user interface, wherein a reverse arching control gesture causes the one or more initial indicators to reappear, wherein the annulus is rotated around a central indicator on the initial circular graphical user interface, the central indicator displaying stored application supplied data and formulas operative on the stored application supplied data.

19. The system of claim 18 further comprising a camera on a center of a rear surface, a microphone, an earpiece, a loud speaker, GPS, a touchscreen for interacting with the circular graphical user interface and one or more communications ports.

20. The system of claim 18 further comprising a charging station for charging the battery of the circular mobile communications system, the charging station having a slanted surface extending downward into a lipped portion configured to hold the circular mobile communications system.

\* \* \* \* \*